(12) United States Patent
Prevost et al.

(10) Patent No.: US 11,371,556 B2
(45) Date of Patent: Jun. 28, 2022

(54) POLYCRYSTALLINE DIAMOND LINEAR BEARINGS

(71) Applicant: XR DOWNHOLE, LLC, Houston, TX (US)

(72) Inventors: Gregory Prevost, Spring, TX (US); William W. King, Houston, TX (US); David P. Miess, Spring, TX (US); Michael R. Reese, Houston, TX (US)

(73) Assignee: XR Reserve LLC, Houston, TX (US)

( * ) Notice: Subject to any disclaimer, the term of this patent is extended or adjusted under 35 U.S.C. 154(b) by 169 days.

(21) Appl. No.: 16/898,219

(22) Filed: Jun. 10, 2020

(65) Prior Publication Data

US 2020/0378440 A1    Dec. 3, 2020

Related U.S. Application Data

(63) Continuation-in-part of application No. 16/425,758, filed on May 29, 2019, now Pat. No. 11,035,407, and a continuation-in-part of application No. 16/049,631, filed on Jul. 30, 2018, now Pat. No. 11,014,759, said application No. 16/425,758 is a continuation-in-part of application No. 16/049,588, filed on Jul. 30, 2018, now Pat. No. 10,465,775, and a continuation-in-part of application No. 16/049,617, filed on Jul. 30, 2018, now Pat. No. 10,760,615, and a continuation-in-part of application No. 16/049,608, filed on Jul. 30, 2018, now Pat. No. 10,738,821.

(51) Int. Cl.
*F16C 29/02* (2006.01)
*F16C 33/04* (2006.01)

(52) U.S. Cl.
CPC ............ *F16C 29/02* (2013.01); *F16C 33/043* (2013.01); *F16C 2206/04* (2013.01); *F16C 2240/54* (2013.01)

(58) Field of Classification Search
CPC .... F16C 29/02; F16C 33/043; F16C 2206/04; F16C 2240/54
See application file for complete search history.

(56) References Cited

U.S. PATENT DOCUMENTS

| | | | |
|---|---|---|---|
| 1,798,604 | A | 3/1931 | Hoke |
| 1,963,956 | A | 6/1934 | James |
| 2,259,023 | A | 10/1941 | Clark |

(Continued)

FOREIGN PATENT DOCUMENTS

| | | |
|---|---|---|
| CA | 2891268 A1 | 11/2016 |
| DE | 4226986 A1 | 2/1994 |

(Continued)

OTHER PUBLICATIONS

International Search Report and Written Opinion dated Aug. 3, 2020 (issued in PCT Application No. PCT/US20/21549) [11 pages].

(Continued)

*Primary Examiner* — Gene O Crawford
*Assistant Examiner* — Keith R Campbell
(74) *Attorney, Agent, or Firm* — Michael S. McCoy; Amatong McCoy LLC

(57) ABSTRACT

Linear bearings assemblies are provided that include polycrystalline diamond bearing surfaces that are engaged with diamond solvent-catalyst bearing. Also provided are methods of making and using linear bearing assemblies.

24 Claims, 12 Drawing Sheets

(56) References Cited

U.S. PATENT DOCUMENTS

| | | | |
|---|---|---|---|
| 2,299,978 A | 10/1942 | Hall |
| 2,407,586 A | 9/1946 | Summers |
| 2,567,735 A | 9/1951 | Scott |
| 2,693,396 A | 11/1954 | Gondek |
| 2,758,181 A | 8/1956 | Crouch |
| 2,788,677 A | 4/1957 | Hayek |
| 2,877,662 A | 3/1959 | Eduard |
| 2,897,016 A | 7/1959 | Baker |
| 2,947,609 A | 8/1960 | Strong |
| 2,947,610 A | 8/1960 | Hall et al. |
| 3,132,904 A | 5/1964 | Kohei et al. |
| 3,559,802 A | 2/1971 | Eidus |
| 3,582,161 A | 6/1971 | Hudson |
| 3,603,652 A | 9/1971 | Youden |
| 3,650,714 A | 3/1972 | Farkas |
| 3,697,141 A | 10/1972 | Garrett |
| 3,707,107 A | 12/1972 | Bieri |
| 3,741,252 A | 6/1973 | Williams |
| 3,745,623 A | 7/1973 | Wentorf et al. |
| 3,752,541 A | 8/1973 | Mcvey |
| 3,866,987 A | 2/1975 | Gamer |
| 3,869,947 A | 3/1975 | Vandenkieboom |
| 3,920,290 A | 11/1975 | Evarts |
| 4,085,634 A | 4/1978 | Sattler |
| 4,182,537 A | 1/1980 | Oster |
| 4,225,322 A | 9/1980 | Knemeyer |
| 4,238,137 A | 12/1980 | Furchak et al. |
| 4,285,550 A | 8/1981 | Blackbum et al. |
| 4,364,136 A | 12/1982 | Hattan |
| 4,382,637 A | 5/1983 | Blackburn et al. |
| 4,398,772 A | 8/1983 | Odell |
| 4,410,054 A | 10/1983 | Nagel et al. |
| 4,410,284 A | 10/1983 | Herrick |
| 4,428,627 A | 1/1984 | Teramachi |
| 4,432,682 A | 2/1984 | McKewan |
| 4,468,138 A | 8/1984 | Nagel |
| 4,554,208 A | 11/1985 | MacIver et al. |
| 4,560,014 A | 12/1985 | Geczy |
| 4,620,601 A | 11/1986 | Nagel |
| RE32,380 E | 3/1987 | Wentorf, Jr. et al. |
| 4,662,348 A | 5/1987 | Hall et al. |
| 4,679,639 A | 7/1987 | Barr et al. |
| 4,689,847 A | 9/1987 | Huber |
| 4,720,199 A | 1/1988 | Geczy et al. |
| 4,729,440 A | 3/1988 | Hall |
| 4,732,490 A | 3/1988 | Masciarelli |
| 4,738,322 A | 4/1988 | Hall et al. |
| 4,764,036 A | 8/1988 | McPherson |
| 4,796,670 A | 1/1989 | Russell et al. |
| 4,797,011 A | 1/1989 | Saeki et al. |
| 4,858,688 A | 8/1989 | Edwards et al. |
| 4,906,528 A | 3/1990 | Cerceau et al. |
| 4,958,692 A | 9/1990 | Anderson |
| 5,011,514 A | 4/1991 | Cho et al. |
| 5,011,515 A | 4/1991 | Frushour |
| 5,030,276 A | 7/1991 | Sung et al. |
| 5,037,212 A | 8/1991 | Justman et al. |
| 5,066,145 A | 11/1991 | Sibley et al. |
| 5,067,826 A | 11/1991 | Lemelson |
| 5,092,687 A | 3/1992 | Hall |
| 5,112,146 A | 5/1992 | Stangeland |
| 5,123,772 A | 6/1992 | Anderson |
| 5,151,107 A | 9/1992 | Cho et al. |
| 5,176,483 A | 1/1993 | Baumann et al. |
| 5,193,363 A | 3/1993 | Petty |
| 5,205,188 A | 4/1993 | Repenning et al. |
| 5,253,939 A | 10/1993 | Hall |
| 5,271,749 A | 12/1993 | Rai et al. |
| 5,351,770 A | 10/1994 | Cawthorne et al. |
| 5,358,041 A | 10/1994 | O'Hair |
| 5,358,337 A | 10/1994 | Codatto |
| 5,375,679 A | 12/1994 | Biehl |
| 5,385,715 A | 1/1995 | Fish |
| 5,447,208 A | 9/1995 | Lund et al. |
| 5,462,362 A | 10/1995 | Yuhta et al. |
| 5,464,086 A | 11/1995 | Coelln |
| 5,514,183 A | 5/1996 | Epstein et al. |
| 5,522,467 A | 6/1996 | Stevens et al. |
| 5,533,604 A | 7/1996 | Brierton |
| 5,538,346 A | 7/1996 | Frias et al. |
| 5,540,314 A | 7/1996 | Coelln |
| 5,560,716 A | 10/1996 | Tank et al. |
| 5,618,114 A | 4/1997 | Katahira |
| 5,645,617 A | 7/1997 | Frushour |
| 5,653,300 A | 8/1997 | Lund et al. |
| 5,715,898 A | 2/1998 | Anderson |
| 5,833,019 A | 11/1998 | Gynz-Rekowski |
| 5,855,996 A | 1/1999 | Corrigan et al. |
| 5,948,541 A | 9/1999 | Inspektor |
| 6,045,029 A | 4/2000 | Scott |
| 6,109,790 A | 8/2000 | Gynz-Rekowski et al. |
| 6,120,185 A | 9/2000 | Masciarelli, Jr. |
| 6,129,195 A | 10/2000 | Matheny |
| 6,152,223 A | 11/2000 | Abdo et al. |
| 6,164,109 A | 12/2000 | Bartosch |
| 6,209,185 B1 | 4/2001 | Scott |
| 6,279,716 B1 | 8/2001 | Kayatani et al. |
| 6,378,633 B1 | 4/2002 | Moore et al. |
| 6,409,388 B1 | 6/2002 | Lin |
| 6,457,865 B1 | 10/2002 | Masciarelli, Jr. |
| 6,488,103 B1 | 12/2002 | Dennis et al. |
| 6,488,715 B1 | 12/2002 | Pope et al. |
| 6,516,934 B2 | 2/2003 | Masciarelli, Jr. |
| 6,517,583 B1 | 2/2003 | Pope et al. |
| 6,652,201 B2 | 11/2003 | Kunimori et al. |
| 6,655,845 B1 * | 12/2003 | Pope ............... F16C 33/36 384/492 |
| 6,737,377 B1 | 5/2004 | Sumiya et al. |
| 6,764,219 B2 | 7/2004 | Doll et al. |
| 6,808,019 B1 | 10/2004 | Mabry |
| 6,814,775 B2 | 11/2004 | Scurlock et al. |
| 6,951,578 B1 | 10/2005 | Belnap et al. |
| 7,007,787 B2 | 3/2006 | Pallini et al. |
| 7,128,173 B2 | 10/2006 | Lin |
| 7,198,043 B1 | 4/2007 | Zhang |
| 7,234,541 B2 | 6/2007 | Scott et al. |
| 7,311,159 B2 | 12/2007 | Lin et al. |
| 7,441,610 B2 | 10/2008 | Belnap et al. |
| 7,475,744 B2 | 1/2009 | Pope |
| 7,552,782 B1 | 6/2009 | Sexton et al. |
| 7,703,982 B2 | 4/2010 | Cooley |
| 7,737,377 B1 | 6/2010 | Dodal et al. |
| 7,845,436 B2 | 12/2010 | Cooley et al. |
| 7,861,805 B2 | 1/2011 | Dick et al. |
| 7,870,913 B1 | 1/2011 | Sexton et al. |
| 8,069,933 B2 | 12/2011 | Sexton et al. |
| 8,109,247 B2 | 2/2012 | Wakade et al. |
| 8,119,240 B2 | 2/2012 | Cooper |
| 8,163,232 B2 | 4/2012 | Fang et al. |
| 8,277,124 B2 | 10/2012 | Sexton et al. |
| 8,277,722 B2 | 10/2012 | DiGiovanni |
| 8,365,846 B2 | 2/2013 | Dourfaye et al. |
| 8,480,304 B2 | 7/2013 | Cooley et al. |
| 8,485,284 B2 | 7/2013 | Sithebe |
| 8,613,554 B2 | 12/2013 | Tessier et al. |
| 8,627,904 B2 | 1/2014 | Voronin |
| 8,678,657 B1 | 3/2014 | Knuteson et al. |
| 8,701,797 B2 | 4/2014 | Baudoin |
| 8,734,550 B1 | 5/2014 | Sani |
| 8,757,299 B2 | 6/2014 | DiGiovanni et al. |
| 8,763,727 B1 | 7/2014 | Cooley et al. |
| 8,764,295 B2 | 7/2014 | Dadson et al. |
| 8,881,849 B2 | 11/2014 | Shen et al. |
| 8,939,652 B2 * | 1/2015 | Peterson ............... F16C 19/22 384/492 |
| 8,974,559 B2 | 3/2015 | Frushour |
| 9,004,198 B2 | 4/2015 | Kulkarni |
| 9,010,418 B2 | 4/2015 | Pereyra et al. |
| 9,045,941 B2 | 6/2015 | Chustz |
| 9,103,172 B1 | 8/2015 | Bertagnolli et al. |
| 9,127,713 B1 | 9/2015 | Lu |
| 9,145,743 B2 | 9/2015 | Shen et al. |
| 9,222,515 B2 | 12/2015 | Chang |
| 9,273,381 B2 | 3/2016 | Qian et al. |

(56) References Cited

U.S. PATENT DOCUMENTS

| | | | |
|---|---|---|---|
| 9,284,980 B1* | 3/2016 | Miess | E04B 1/36 |
| 9,309,923 B1 | 4/2016 | Lingwall et al. | |
| 9,353,788 B1 | 5/2016 | Tulett et al. | |
| 9,366,085 B2 | 6/2016 | Panahi | |
| 9,404,310 B1 | 8/2016 | Sani et al. | |
| 9,410,573 B1 | 8/2016 | Lu | |
| 9,429,188 B2 | 8/2016 | Peterson et al. | |
| 9,488,221 B2 | 11/2016 | Gonzalez | |
| 9,562,562 B2 | 2/2017 | Peterson | |
| 9,643,293 B1 | 5/2017 | Miess et al. | |
| 9,702,401 B2 | 7/2017 | Gonzalez | |
| 9,732,791 B1 | 8/2017 | Gonzalez | |
| 9,776,917 B2 | 10/2017 | Tessitore et al. | |
| 9,790,749 B2 | 10/2017 | Chen | |
| 9,790,818 B2 | 10/2017 | Berruet et al. | |
| 9,803,432 B2 | 10/2017 | Wood et al. | |
| 9,822,523 B1 | 11/2017 | Miess | |
| 9,840,875 B2 | 12/2017 | Harvey et al. | |
| 9,869,135 B1 | 1/2018 | Martin | |
| 10,113,362 B2 | 10/2018 | Ritchie et al. | |
| 10,294,986 B2 | 5/2019 | Gonzalez | |
| 10,307,891 B2 | 6/2019 | Daniels et al. | |
| 10,408,086 B1 | 9/2019 | Meier | |
| 10,465,775 B1 | 11/2019 | Miess et al. | |
| 10,683,895 B2 | 6/2020 | Hall et al. | |
| 10,711,792 B2 | 7/2020 | Vidalenc et al. | |
| 10,711,833 B2 | 7/2020 | Manwill et al. | |
| 10,738,821 B2 | 8/2020 | Miess et al. | |
| 10,807,913 B1 | 10/2020 | Hawks et al. | |
| 10,968,700 B1 | 4/2021 | Raymond | |
| 10,968,703 B2 | 4/2021 | Haugvaldstad et al. | |
| 11,085,488 B2 | 8/2021 | Gonzalez | |
| 2002/0020526 A1 | 2/2002 | Male et al. | |
| 2003/0019106 A1* | 1/2003 | Pope | A61L 27/08 29/898 |
| 2003/0075363 A1 | 4/2003 | Lin et al. | |
| 2003/0159834 A1 | 8/2003 | Kirk et al. | |
| 2003/0220691 A1 | 11/2003 | Songer et al. | |
| 2004/0031625 A1 | 2/2004 | Lin et al. | |
| 2004/0134687 A1 | 7/2004 | Radford et al. | |
| 2004/0163822 A1 | 8/2004 | Zhang et al. | |
| 2004/0219362 A1 | 11/2004 | Wort et al. | |
| 2004/0223676 A1 | 11/2004 | Pope et al. | |
| 2006/0060392 A1 | 3/2006 | Eyre | |
| 2006/0165973 A1 | 7/2006 | Dumm et al. | |
| 2007/0046119 A1 | 3/2007 | Cooley | |
| 2008/0217063 A1 | 9/2008 | Moore et al. | |
| 2008/0253706 A1 | 10/2008 | Bischof et al. | |
| 2009/0020046 A1 | 1/2009 | Marcelli | |
| 2009/0087563 A1 | 4/2009 | Voegele et al. | |
| 2009/0268995 A1 | 10/2009 | Ide et al. | |
| 2010/0037864 A1 | 2/2010 | Dutt et al. | |
| 2010/0276200 A1 | 11/2010 | Schwefe et al. | |
| 2010/0307069 A1 | 12/2010 | Bertagnolli et al. | |
| 2011/0174547 A1 | 7/2011 | Sexton et al. | |
| 2011/0203791 A1 | 8/2011 | Jin et al. | |
| 2011/0220415 A1 | 9/2011 | Jin et al. | |
| 2011/0297454 A1 | 12/2011 | Shen et al. | |
| 2012/0037425 A1 | 2/2012 | Sexton et al. | |
| 2012/0057814 A1 | 3/2012 | Dadson et al. | |
| 2012/0225253 A1 | 9/2012 | DiGiovanni et al. | |
| 2012/0281938 A1 | 11/2012 | Peterson et al. | |
| 2013/0000442 A1 | 1/2013 | Wiesner et al. | |
| 2013/0004106 A1 | 1/2013 | Wenzel | |
| 2013/0146367 A1 | 6/2013 | Zhang et al. | |
| 2013/0170778 A1 | 7/2013 | Higginbotham et al. | |
| 2014/0037232 A1 | 2/2014 | Marchand et al. | |
| 2014/0176139 A1 | 6/2014 | Espinosa et al. | |
| 2014/0254967 A1 | 9/2014 | Gonzalez | |
| 2014/0341487 A1 | 11/2014 | Cooley et al. | |
| 2014/0355914 A1 | 12/2014 | Cooley et al. | |
| 2015/0027713 A1 | 1/2015 | Penisson | |
| 2015/0132539 A1 | 5/2015 | Bailey et al. | |
| 2016/0153243 A1 | 6/2016 | Hinz et al. | |
| 2016/0312535 A1 | 10/2016 | Ritchie et al. | |
| 2017/0030393 A1 | 2/2017 | Phua et al. | |
| 2017/0138224 A1 | 5/2017 | Henry et al. | |
| 2017/0234071 A1 | 8/2017 | Spalz et al. | |
| 2017/0261031 A1 | 9/2017 | Gonzalez et al. | |
| 2018/0087134 A1 | 3/2018 | Chang et al. | |
| 2018/0209476 A1 | 7/2018 | Gonzalez | |
| 2018/0216661 A1 | 8/2018 | Gonzalez | |
| 2018/0264614 A1 | 9/2018 | Winkelmann et al. | |
| 2018/0320740 A1 | 11/2018 | Hall et al. | |
| 2019/0063495 A1 | 2/2019 | Peterson et al. | |
| 2019/0136628 A1 | 5/2019 | Savage et al. | |
| 2019/0170186 A1 | 6/2019 | Gonzalez et al. | |
| 2020/0031586 A1 | 1/2020 | Miess et al. | |
| 2020/0032841 A1 | 1/2020 | Miess et al. | |
| 2020/0032846 A1 | 1/2020 | Miess et al. | |
| 2020/0056659 A1 | 2/2020 | Prevost et al. | |
| 2020/0063498 A1 | 2/2020 | Prevost et al. | |
| 2020/0063503 A1 | 2/2020 | Reese et al. | |
| 2020/0182290 A1 | 6/2020 | Doehring et al. | |
| 2020/0325933 A1 | 10/2020 | Prevost et al. | |
| 2020/0362956 A1 | 11/2020 | Prevost et al. | |
| 2021/0140277 A1 | 5/2021 | Hall et al. | |
| 2021/0148406 A1 | 5/2021 | Hoyle et al. | |
| 2021/0198949 A1 | 7/2021 | Haugvaldstad et al. | |
| 2021/0207437 A1 | 7/2021 | Raymond | |
| 2021/0222734 A1 | 7/2021 | Gonzalez et al. | |

FOREIGN PATENT DOCUMENTS

| | | |
|---|---|---|
| DE | 29705983 U1 | 6/1997 |
| JP | S6061404 A | 4/1985 |
| JP | 06174051 A | 6/1994 |
| JP | 2004002912 A | 1/2004 |
| JP | 2008056735 A | 3/2008 |
| WO | 8700080 A1 | 1/1987 |
| WO | 2004001238 A2 | 12/2003 |
| WO | 2006028327 A1 | 3/2006 |
| WO | 2013043917 A1 | 3/2013 |
| WO | 2014189763 A1 | 11/2014 |
| WO | 2016089680 A1 | 6/2016 |
| WO | 2017105883 A1 | 6/2017 |
| WO | 2018041578 A1 | 3/2018 |
| WO | 2018226380 A1 | 12/2018 |
| WO | 2019096851 A1 | 5/2019 |
| WO | 2006011028 A1 | 2/2020 |

OTHER PUBLICATIONS

International Search Report and Written Opinion dated Aug. 4, 2020 (issued in PCT Application No. PCT/US2020/034437) [10 pages].
International Search Report and Written Opinion dated Sep. 2, 2020 (issued in PCT Application No. PCT/US20/37048) [8 pages].
International Search Report and Written Opinion dated Sep. 8, 2020 (issued in PCT Application No. PCT/US20/35316) [9 pages].
International Search Report and Written Opinion dated Sep. 9, 2020 (issued in PCT Application No. PCT/US20/32196) [13 pages].
Bovenkerk, DR. H. P; Bundy, DR. F. P; Hall, DR. H. T.; Strong, DR. H. M.; Wentorf, Jun., DR. R. H. Preparation of Diamond, Nature, Oct. 10, 1959, pp. 1094-1098, vol. 184.
Chen, Y.; Nguyen, T; Zhang, L.C.; Polishing of polycrystalline diamond by the technique of dynamic friction-Part 5: Quantitative analysis of material removal, International Journal of Machine Tools & Manufacture, 2009, pp. 515-520, vol. 49, Elsevier.
Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.
Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.
Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.

(56) References Cited

OTHER PUBLICATIONS

Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.
Dobrzhinetskaya, Larissa F.; Green, II, Harry W.; Diamond Synthesis from Graphite in the Presence of Water and SiO2: Implications for Diamond Formation in Quartzites from Kazakhstan, International Geology Review, 2007, pp. 389-400, vol. 49.
Element six, The Element Six CVD Diamond Handbook, Accessed on Nov. 1, 2019, 28 pages.
Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.
Hudson Bearings Air Cargo Ball Transfers brochure, accessed on Jun. 23, 2018, 8 Pages, Columbus, Ohio.
Hudson Bearings Air Cargo Ball Transfers Installation and Maintenance Protocols, accessed on Jun. 23, 2018, pp. 1-5.
International Search Report and Written Opinion dated Oct. 21, 2019 (issued in PCT Application No. PCT/US2019/043746) [14 pages].
International Search Report and Written Opinion dated Oct. 22, 2019 (issued in PCT Application No. PCT/US2019/043744) [11 pages].
International Search Report and Written Opinion dated Oct. 25, 2019 (issued in PCT Application No. PCT/US2019/044682) [20 pages].
International Search Report and Written Opinion dated Oct. 29, 2019 (issued in PCT Application No. PCT/US2019/043741) [15 pages].
International Search Report and Written Opinion dated Sep. 9, 2019 (issued in PCT Application No. PCT/US2019/043732) [10 pages].
Liao, Y.; Marks, L.; In situ single asperity wear at the nanometre scale, International Materials Reviews, 2016, pp. 1-17, Taylor & Francis.
Linear Rolling Bearings Me En 7960—Precision Machine Design Topic 8, Presentation, Accessed on Jan. 26, 2020, 23 Pages, University of Utah.
Linear-motion Bearing, Wikipedia, https://en.wikipedia.org/w/index.php?title=Linear-motion_bearing&oldid=933640111, Jan. 2, 2020, 4 Pages.
Machinery's Handbook 30th Edition, Copyright Page and Coefficients of Friction Page, 2016, p. 158 (2 Pages total), Industrial Press, Inc, South Norwalk, U.S A.
Machinery's Handbook, 2016, Industrial Press, Inc., 30th edition, pp. 843 and 1055 (6 pages total).
McCarthy, J. Michael; Cam and Follower Systems, PowerPoint Presentation, Jul. 25, 2009, pp. 1-14, UCIrvine The Henry Samueli School of Engineering.
McGill Cam Follower Bearings brochure, 2005, p. 1-19, Back Page, Brochure MCCF-05, Form #8991 (20 Pages total).
Motion & Control NSK Cam Followers (Stud Type Track Rollers) Roller Followers (Yoke Type Track Rollers) catalog, 1991, Cover Page, pp. 1-18, Back Page, Cat. No. E1421 2004 C-11, Japan.
Product Catalogue, Asahi Diamond Industrial Australia Pty. Ltd., accessed on Jun. 23, 2018, Cover Page, Blank page, 2 Notes Pages, Table of Contents, pp. 1-49 (54 Pages total).
RBC Aerospace Bearings Rolling Element Bearings catalog, 2008, Cover Page, First Page, pp. 1-149, Back Page (152 Pages total).
RGPBalls Ball Transfer Units catalog, accessed on Jun. 23, 2018, pp. 1-26, 2 Back Pages (28 Pages total).
Sandvik Coromant Hard part turning with CBN catalog, 2012, pp. 1-42, 2 Back Pages (44 Pages total).
Sexton, Timothy N.; Cooley, Craig H.; Diamond Bearing Technology for Deep and Geothermal Drilling, PowerPoint Presentation, 2010, 16 Pages.
SKF Ball transfer units catalog, Dec. 2006, Cover Page, Table of Contents, pp. 1-36, 2 Back Pages (40 Pages total), Publication 940-711.
Sowers, Jason Michael, Examination of the Material Removal Rate in Lapping Polycrystalline Diamond Compacts, A Thesis, Aug. 2011, 2 Cover Pages, p. iii-xiv, pp. 1-87 (101 Pages total).
Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.
Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.
Surface Finish, Wikipedia, https://en.wikipedia.org/wiki/Surface_finish,Retrieved from https://en.wikipedia.org/w/index.php?title=Surface_finish&oldid=919232937, Oct. 2, 2019, 3 pages.
United States Defensive Publication No. T102,901, published Apr. 5, 1983, in U.S. Appl. No. 298,271 [2 Pages].
USSynthetic Bearings and Waukesha Bearings brochure for Diamond Tilting Pad Thrust Bearings, 2015, 2 Pages.
USSynthetic Bearings brochure, accessed on Jun. 23, 2018, 12 Pages, Orem, Utah.
Zeidan, Fouad Y.; Paquette, Donald J., Application of High Speed and High Performance Fluid Film Bearings in Rotating Machinery, 1994, pp. 209-234.
Zhigadlo, N. D., Spontaneous growth of diamond from MnNi solvent-catalyst using opposed anvil-type high-pressure apparatus, accessed on Jun. 28, 2018, pp. 1-12, Laboratory for Solid State Physics, Switzerland.
Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.
International Preliminary Report on Patentability issued in PCT Application No. PCT/US/2020/037048; dated Dec. 9, 2021 [7 pages].
International Search Report and Written Opinion dated Jan. 15, 2021 (issued in PCT Application No. PCT/US2020/049382) [18 pages].

* cited by examiner

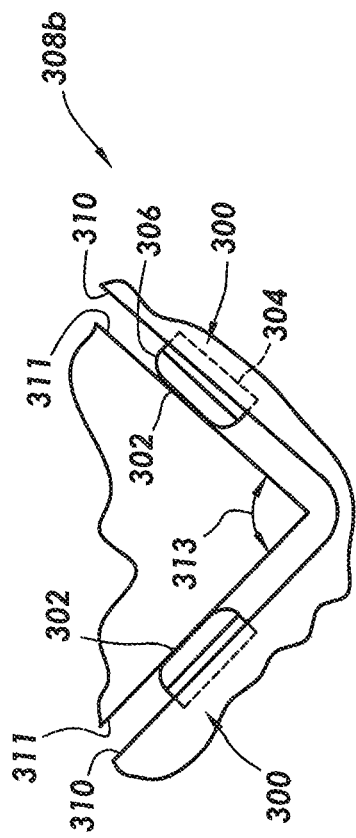
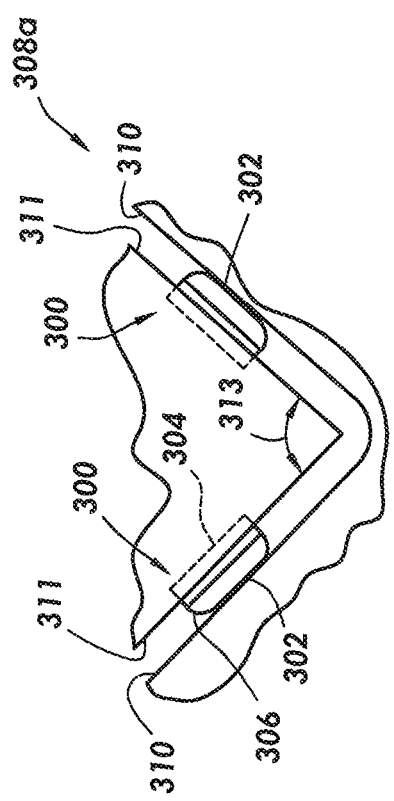

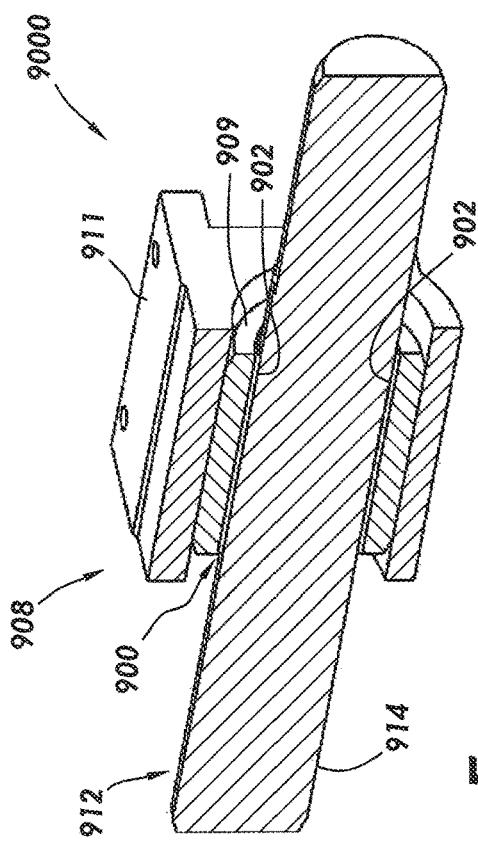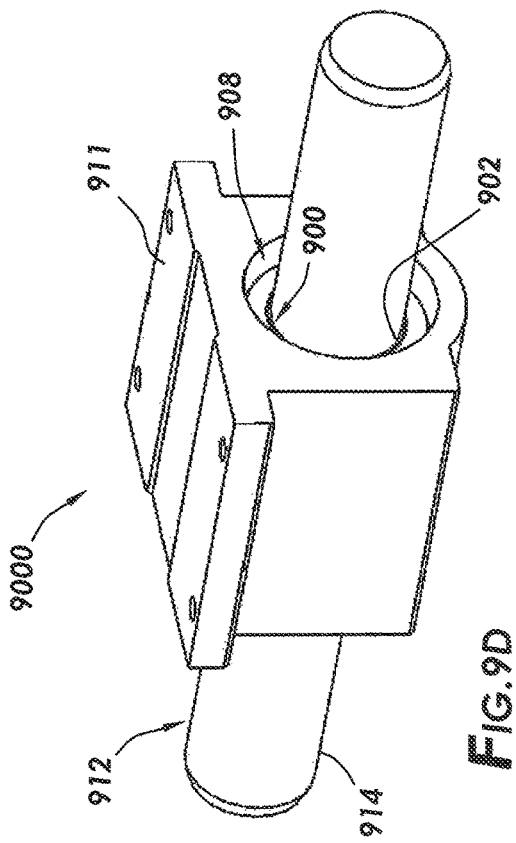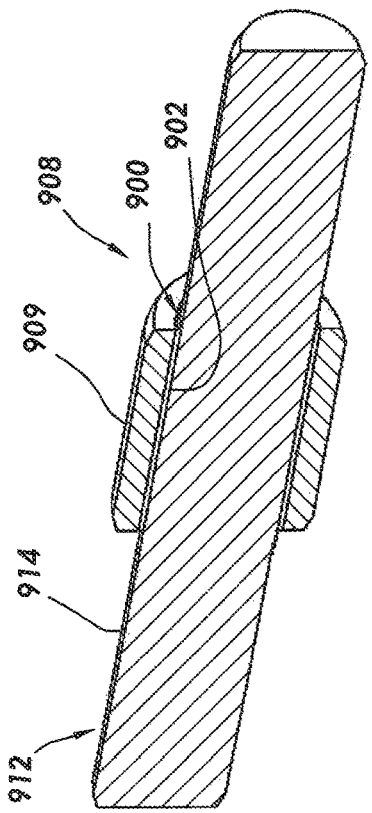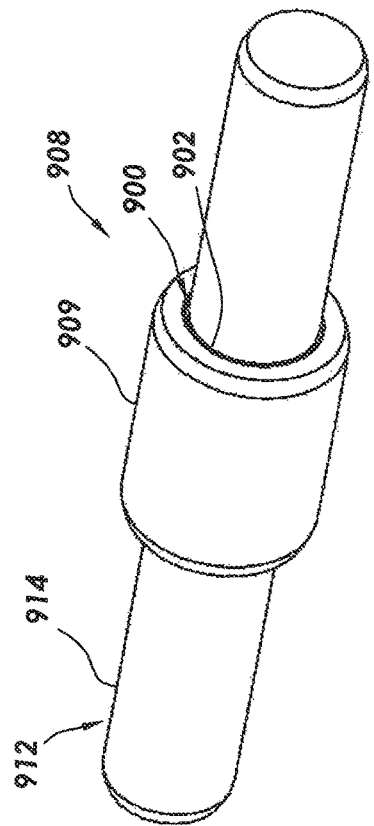

POLYCRYSTALLINE DIAMOND LINEAR BEARINGS

CROSS-REFERENCE TO RELATED APPLICATIONS

The present application is Continuation-in-Part of U.S. patent application Ser. No. 16/049,631 (pending), entitled "Roller Ball Assembly with Superhard Elements", filed on Jul. 30, 2018. The present application is also a Continuation-in-Part of U.S. patent application Ser. No. 16/425,758 (pending), entitled "Material Treatments for Diamond-on-Diamond Reactive Material Bearing Engagements, filed on May 29, 2019, which is itself a Continuation-in-Part of: U.S. patent application Ser. No. 16/049,588, filed on Jul. 30, 2018, now issued as U.S. Pat. No. 10,465,775; Ser. No. 16/049,608 (pending), filed on Jul. 30, 2018; and Ser. No. 16/049,617 (pending) filed on Jul. 30, 2018. The entireties of each of U.S. patent application Ser. Nos. 16/425,758; 16/049,588; 16/049,608; 16/049,617; and 16/049,631 are incorporated herein by reference.

FIELD

The present disclosure relates to linear bearings that include polycrystalline diamond bearing surfaces, to apparatus and systems including the same, and to methods of making and using the same.

BACKGROUND

Linear bearings are employed in myriad applications including, but not limited to, machine tool ways, precision positioning tables, robotics, additive manufacturing printers, transfer shuttles, food processing equipment, and semiconductor manufacturing. Linear bearings are typically in the form of slide bearings or roller ball guide bearings. Frequently, roller ball guide bearings are preferred because they typically offer a lower coefficient of friction in use.

Both slide bearings and roller ball guide bearings may be lubricated or non-lubricated. In many instances, non-lubricated linear bearings exhibit resistance to movement at start-up due to friction, which negatively affects the precision of movement. However, employing lubrication to reduce friction in linear bearings can create a need for ongoing maintenance. The lubrication can further become a trap for contamination.

Many prior art linear bearings use recirculating balls. Recirculating ball type bearings are capable of handling a reciprocating cylindrical shaft that may exhibit rotational movement in combination with linear reciprocation. Recirculating ball bearings require a high number of precision roller balls and complex ball travel channels to function properly. In linear bearings where the roller balls are the primary load bearing structure point, loading on the roller balls and against the opposing surface is problematic.

Some references that provide relevant background in relation to linear bearings are U.S. Pat. Nos. 2,693,396; 3,603,652; 5,193,363; 4,428,627; 9,222,515; and 5,618,114.

When polycrystalline diamond (PCD) elements are used in moving parts, typically both the engagement surface and the opposing engagement surface are composed of polycrystalline diamond. This is, at least in part, because thermally stable polycrystalline diamond (TSP), either supported or unsupported by tungsten carbide, and polycrystalline diamond compact (PDC) have been considered as contraindicated for use in the machining of diamond reactive materials. Diamond reactive materials include metals, metal alloys, composites, hardfacings, coatings, or platings that contain more than trace amounts of diamond catalyst or solvent elements (also referred to as diamond solvent-catalysts or diamond catalyst-solvents) including iron, cobalt, nickel, ruthenium, rhodium, palladium, chromium, manganese, copper, titanium, or tantalum. Further, this prior contraindication of the use of polycrystalline diamond extends to so called "superalloys", including iron-based, cobalt-based and nickel-based superalloys containing more than trace amounts of diamond catalyst or solvent elements. At certain surface speeds in moving parts, load and attendant temperature generated, such as at a cutting tip, often exceeds the graphitization temperature of diamond (i.e., about 700° C.), which can, in the presence of diamond catalyst or solvent elements, lead to rapid wear and failure of components. Without being bound by theory, the specific failure mechanism is believed to result from the chemical interaction of the carbon bearing diamond with the carbon attracting material that is being machined. An exemplary reference concerning the contraindication of polycrystalline diamond for diamond catalyst or solvent containing metal or alloy machining is U.S. Pat. No. 3,745,623. The contraindication of polycrystalline diamond for machining diamond catalyst or diamond solvent containing materials has long caused the avoidance of the use of polycrystalline diamond in all contacting applications with such materials.

It would be desirable to have a linear bearing that exhibits a low coefficient of friction during use, has a long life, is less subject to point loading, is able to withstand contamination without an unacceptable increase in wear, and does not necessarily require lubrication.

BRIEF SUMMARY

Some embodiments of the present disclosure include a linear bearing assembly. The assembly includes a linear bearing having a body with a surface. A polycrystalline diamond bearing element is coupled with the surface. The polycrystalline diamond bearing element has a polycrystalline diamond bearing surface. The assembly includes an opposing component having an opposing bearing surface thereon. The opposing bearing surface has a material containing at least 2 weight percent of diamond solvent-catalyst based on a total weight of the material. The linear bearing is movably coupled with the opposing component such that the polycrystalline diamond bearing surface is engaged with the diamond solvent-catalyst.

Some embodiments of the present disclosure include a method of bearing load. The method includes providing a linear bearing that has a body with a surface and a polycrystalline diamond bearing element coupled with the surface. The polycrystalline diamond bearing element has a polycrystalline diamond bearing surface. The method includes providing an opposing component that has an opposing bearing surface thereon. The opposing bearing surface includes a material containing at least 2 weight percent of diamond solvent-catalyst based on a total weight of the material. The method includes movably coupling the linear bearing with the opposing component such that the polycrystalline diamond bearing surface is engaged with the diamond solvent-catalyst.

Some embodiments of the present disclosure include a linear bearing assembly. The assembly includes a linear bearing having a body with a surface. A plurality of polycrystalline diamond bearing elements are coupled with the surface. Each polycrystalline diamond bearing element has a polycrystalline diamond bearing surface. The assembly includes an opposing component that has an opposing bearing surface thereon. The opposing bearing surface includes a material containing at least 2 weight percent of diamond solvent-catalyst based on a total weight of the material. The linear bearing is movably coupled with the opposing component such that the polycrystalline diamond bearing surfaces are engaged with the diamond solvent-catalyst.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 3A depicts a linear bearing having polycrystalline diamond bearing elements on multiple surfaces thereof.

FIG. 3B depicts a linear bearing having polycrystalline diamond bearing elements on multiple surfaces thereof.

FIGS. 9A-9D depict a continuous sleeve bearing in accordance with the present disclosure.

Figure 1A:
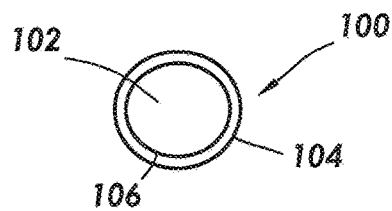
FIG. 1A is a top view of a polycrystalline diamond bearing element.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain embodiments of the present disclosure include linear bearings that include polycrystalline diamond bearing surfaces, apparatus and systems that include such linear bearings, and methods of making and using such linear bearings. In some embodiments, the linear bearings disclosed herein are lubricated bearings. In other embodiments, the linear bearings disclosed herein are non-lubricated bearings.

The linear bearings disclosed herein include one or more polycrystalline diamond bearing elements thereon. Each polycrystalline diamond bearing element provides a diamond bearing surface (also referred to as an "engagement surface") of the linear bearing. Depending on the desired configuration, the diamond bearing surface may be a flat surface or a curved surface (e.g., concave or convex). In at least some embodiments, the diamond engagement surface is engaged with an opposing bearing surface (also referred to as an "opposing engagement surface"), where the opposing bearing surface is a diamond reactive material.

Interfacing Polycrystalline Diamond with Diamond Reactive Materials

In some embodiments, the present disclosure provides for interfacing the contact between a diamond bearing surface of a linear bearing and an opposing bearing surface that includes a diamond solvent-catalyst surface. For example, the polycrystalline diamond surface may be positioned and arranged on or as a bearing surface in a linear bearing for sliding and/or rolling contact with the diamond solvent-catalyst surface. As used herein, "engagement surface" or "bearing surface" refers to the surface of a material or component (e.g., polycrystalline diamond or diamond reactive material) that is positioned and arranged within a linear bearing such that, in operation of the linear bearing, the "engagement surface" or "bearing surface" interfaces the contact between two components. In some embodiments, the diamond bearing surface disclosed herein is in direct contact with an opposing bearing surface (i.e., boundary lubrication), without a fluid film therebetween. In some embodiments, a fluid film may develop (i.e., hydrodynamic lubrication) between the diamond bearing surface and the opposing bearing surface such that the surfaces are not directly in contact with one another, but are engaged through the fluid film. In some aspects, the contact between the diamond bearing surface and opposing bearing surface is between (or a mixture of) direct contact and fluid film (i.e., mixed boundary lubrication).

Diamond Bearing Surface

In some embodiments, the polycrystalline diamond surfaces disclosed herein are surfaces of polycrystalline diamond elements that are coupled with or otherwise incorporated into or with a linear bearing. In some embodiments, the polycrystalline diamond elements are positioned to be flush with a surface of the linear bearing. In other embodiments, the polycrystalline diamond elements are positioned to be raised above the surface of the linear bearing. In other embodiments, the polycrystalline diamond elements are positioned to be recessed below the surface of the linear bearing. In some embodiments, the polycrystalline diamond elements are static relative to the surface of the linear bearing. In other embodiments, the polycrystalline diamond elements are movable (e.g., compliant) relative to the surface of the linear bearing. The polycrystalline diamond elements disclosed herein may be or include thermally stable polycrystalline diamond, either supported or unsupported by tungsten carbide, or polycrystalline diamond compact (PDC). In certain applications, the polycrystalline diamond elements disclosed herein have increased cobalt content transitions layers between the outer polycrystalline diamond surface and a supporting tungsten carbide slug. The polycrystalline diamond elements may be supported by tungsten carbide, or may be unsupported, "standalone" polycrystalline diamond elements that are mounted directly to a linear bearing. The polycrystalline diamond elements may by non-leached, leached, leached and backfilled, thermally stable, coated via chemical vapor deposition (CVD), or processed in various ways as known in the art.

In some embodiments, the engagement surfaces of the polycrystalline diamond elements disclosed herein are planar, convex, or concave. In some embodiments, the polycrystalline diamond elements have beveled edges. The polycrystalline diamond elements may have diameters as small as 3 mm (about ⅛") or as large as 75 mm (about 3"), depending on the application. Typically, the polycrystalline diamond elements have diameters between 8 mm (about ⁵⁄₁₆") and 25 mm (about 1").

Although the polycrystalline diamond elements are most commonly available in cylindrical shapes, it is understood that the technology of the application may be practiced with polycrystalline diamond elements that are square, rectangular, oval, any of the shapes described herein with reference to the Figures, or any other appropriate shape known in the art.

The polycrystalline diamond elements may be arranged in any pattern, layout, spacing or staggering within the linear bearing to provide the desired interfacing of contact, without concern for the need for overlapping contact with polycrystalline diamond elements engagement surfaces on the opposing bearing surface. The polycrystalline diamond elements disclosed herein are, in some embodiments, not shaped to conform to the opposing bearing surface. The polycrystalline diamond elements disclosed herein are, in other embodiments, shaped to conform to the opposing bearing surface.

One performance criterion is that the polycrystalline diamond element is configured and positioned in such a way as to preclude any edge contact with the opposing bearing surface. In some aspects, the polycrystalline diamond elements are subjected to edge radius treatment.

In certain applications, the polycrystalline diamond, or at least the engagement surface thereof, is lapped or polished, optionally highly lapped or highly polished. Although highly polished polycrystalline diamond is used in at least some applications, the scope of this disclosure is not limited to highly polished polycrystalline diamond and includes polycrystalline diamond that is highly lapped or polished. As used herein, a surface is defined as "highly lapped" if the surface has a surface finish of 20 μin or about 20 μin, such as a surface finish ranging from about 18 to about 22 μin. As used herein, a surface is defined as "polished" if the surface has a surface finish of less than about 10 μin, or of from about 2 to about 10 μin. As used herein, a surface is defined as "highly polished" if the surface has a surface finish of less than about 1 μin, or from about 0.5 μin to less than about 2 μin. In some aspects, the polycrystalline diamond engagement surfaces disclosed herein have a surface finish ranging from 0.5 μin to 40 μin, or from 2 μin to 30 μin, or from 5 μin to 20 μin, or from 8 μin to 15 μin, or less than 20 μin, or less than 10 μin, or less than 2 μin, or any range therebetween. Without being bound by theory, it is believed that polycrystalline diamond that has been polished to a surface finish of 0.5 μin has a coefficient of friction that is about half of standard lapped polycrystalline diamond with a surface finish of 20-40 μin. U.S. Pat. Nos. 5,447,208 and 5,653,300 to Lund et al., the entireties of which are incorporated herein by reference, provide disclosure relevant to polishing of polycrystalline diamond. As would be understood by one skilled in the art, surface finish, also referred to as surface texture or surface topography, is a characteristic of a surface as defined by lay, surface roughness, and waviness. Surface finish may be determined in accordance with ASME B46.1-2009. Surface finish may be measured with a profilometer, laser microscope, or with Atomic Force Microscopy, for example. In some embodiments, the opposing engaging surface has a surface finish of from 0.5 to 2,000 μin, or from 1 to 1,900 μin, or from 5 to 1,500 μin, or from 10 to 1,200 μin, or from 50 to 1,000 μin, or from 100 to 800 μin, or from 200 to 600 μin. In some embodiments, the opposing engagement surface has a surface finish that is greater than the engagement surface (i.e., rougher).

Opposing Engagement Surface

The opposing bearing surface is a surface of a diamond reactive material. As used herein, a "diamond reactive material" is a material that contains more than trace amounts of diamond catalyst or diamond solvent, which are also referred to as "diamond catalyst-solvent,", "catalyst-solvent," "diamond solvent-catalyst," or "solvent-catalyst." Some examples of known solvent-catalysts are disclosed in: U.S. Pat. Nos. 6,655,845; 3,745,623; 7,198,043; 8,627,904; 5,385,715; 8,485,284; 6,814,775; 5,271,749; 5,948,541; 4,906,528; 7,737,377; 5,011,515; 3,650,714; 2,947,609; and 8,764,295. As used herein, a diamond reactive material that contains more than "trace amounts" of diamond catalyst or diamond solvent, is a material that contains at least 2 percent by weight (wt. %) diamond catalyst or diamond solvent based on a total weight of the diamond reactive material. In some aspects, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond catalyst or diamond solvent based on a total weight of the diamond reactive material. As would be understood by one skilled in the art, diamond solvent-catalysts are chemical elements, compounds, or materials (e.g., metals) that are capable of reacting with polycrystalline diamond (e.g., catalyzing and/or solubilizing), resulting in the graphitization of the polycrystalline diamond, such as under load and at a temperature at or exceeding the graphitization temperature of diamond (i.e., about 700° C.). Thus, diamond reactive materials include materials that, under load and at a temperature at or exceeding the graphitization temperature of diamond, can lead to wear, sometimes rapid wear, and failure of components formed of or including polycrystalline diamond, such as diamond tipped tools. Diamond reactive materials include, but are not limited to, metals, metal alloys, and composite materials that contain more than trace amounts of diamond solvent-catalysts. In some aspects, the diamond reactive materials are in the form of hardfacings, coatings, or platings. Some exemplary diamond solvent-catalysts include iron, cobalt, nickel, ruthenium, rhodium, palladium, chromium, manganese, copper, titanium, tantalum, and alloys thereof. Thus, a diamond reactive material may be a material that includes more than trace amounts of iron, cobalt, nickel, ruthenium, rhodium, palladium, chromium, manganese, copper, titanium, tantalum, or alloys thereof. One exemplary diamond reactive material is steel. In some aspects, the diamond reactive material is a superalloy including, but not limited to, an iron-based superalloy, a cobalt-based superalloy, or a nickel-based superalloy. In certain aspects, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. For example, superhard materials include materials with a hardness value exceeding 40 gigapascals (GPa) when measured by the Vickers hardness test. As used herein, "superhard materials" are materials that are at least as hard as tungsten carbide, including tungsten carbide tiles and cemented tungsten carbide, such as is determined in accordance with one of these hardness scales. One skilled in the art would understand that a Brinell scale test may be performed, for example, in accordance with ASTM E10-18; the Vickers hardness test may be performed, for example, in accordance with ASTM E92-17; the Rockwell hardness test may be performed, for example, in accordance with ASTM E18; and the Knoop hardness test may be performed, for example, in accordance with ASTM E384-17. The "superhard materials" disclosed herein include, but are not limited to, tile tungsten carbide, cemented tungsten carbide, infiltrated tungsten carbide matrix, silicon carbide, silicon nitride, cubic boron nitride, and polycrystalline diamond. Thus, in some aspects, the "diamond reactive material" is partially or entirely composed of material(s) (e.g., metal, metal alloy, composite) that is softer (less hard) than superhard materials, such as less hard than tungsten carbide (e.g., tile or cemented), as determined in accordance with one of these hardness tests, such as the Brinell scale.

The opposing bearing surface is or includes a metal or metal alloy that contains at least 2 wt. % of a diamond solvent-catalyst based on a total weight of the metal or metal alloy. The diamond solvent-catalyst may be iron, cobalt, nickel, ruthenium, rhodium, palladium, chromium, manganese, copper, titanium, tantalum, or alloys thereof. The opposing bearing surface is or includes a metal or metal alloy that contains from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the metal or metal alloy (e.g., from 2 to 100 wt. %, of iron, cobalt, nickel, ruthenium, rhodium, palladium, chromium, manganese, copper, titanium, tantalum, or alloys thereof).

In some aspects, the opposing bearing surface has carbon applied thereto. In some such aspects, the carbon is applied to the opposing bearing surface prior to engagement with the diamond bearing surface. For example, the opposing bearing surface may be saturated with carbon. Without being bound by theory, it is believed that such application of carbon reduces the ability of the diamond solvent-catalyst in the opposing bearing surface to attract carbon through graphitization of the surface of the polycrystalline diamond element. That is, the carbon that is applied to the opposing bearing surface functions as a sacrificial layer of carbon. In addition, the opposing surface may be treated via any of the methods disclosed and described in the '758 Application. The opposing bearing surfaces disclosed herein may be surfaces that contain at least 2 wt. % of diamond solvent-catalyst.

In some embodiments, the opposing bearing surface is a treated surface in accordance with U.S. patent application Ser. No. 16/425,758. For example, the opposing bearing surface (also referred to as the opposing engagement surface) may be hardened, such as via cold working and work hardening processes including burnishing and shot peening; and/or heat-treating processes including through hardening, case hardening, and subzero, cryogenic, deep freezing treatments. Also, the opposing bearing surface may be plated and/or coated, such as via electroplating, electroless plating, including chromium plating, phosphating, vapor deposition, including physical vapor deposition (PVD) and chemical vapor deposition (CVD); or anodizing. Also, the opposing bearing surface may be cladded, such as via roll bonding, laser cladding, or explosive welding.

Linear Bearings

Some embodiments include a linear bearing that includes one or more polycrystalline diamond bearing surfaces engaged with one or more opposing bearing surfaces of diamond solvent-catalyst. In some embodiments, the polycrystalline diamond bearing surfaces are highly lapped surfaces, polished surfaces, or highly polished surfaces. The polycrystalline diamond bearing surfaces of the linear bearings are in sliding engagement with an opposing bearing surface (i.e., opposing surface of the linear bearing) that is a diamond solvent-catalyst surface. Depending on the desired configuration of the linear bearing, the sliding engagement between the diamond bearing surface and the opposing bearing surface may be a flat surface interface, a curved (e.g., cylindrical) surface interface, or a combination of flat and curved surface interfaces.

FIG. 1A depicts a polycrystalline diamond bearing element 100. Polycrystalline diamond bearing element 100 has a polycrystalline diamond 106 supported on a support 104. Polycrystalline diamond 106 has a diamond bearing surface 102. Diamond bearing surface 102 may be lapped, highly lapped, polished, or highly polished.

Figure 1B:
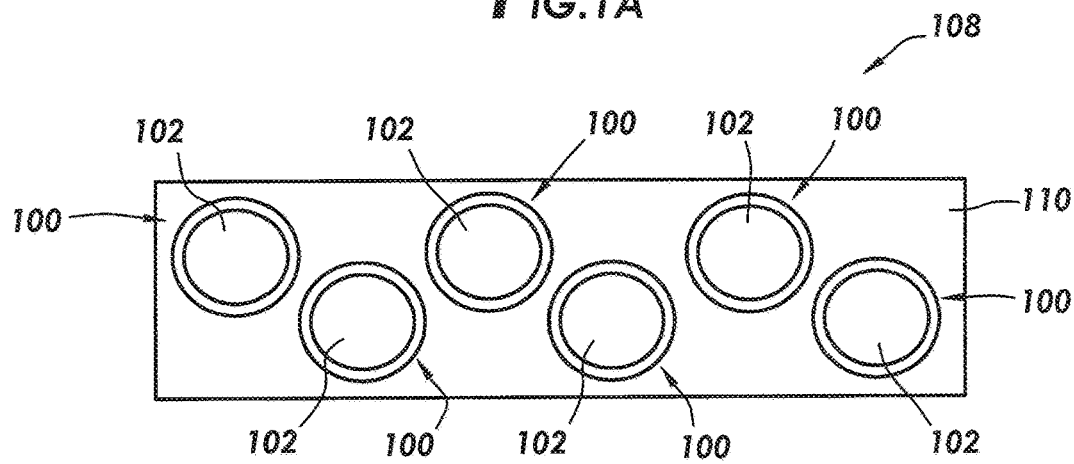
FIG. 1B is a top view of a linear bearing having a plurality of polycrystalline diamond bearing elements thereon.

FIG. 1B depicts a linear bearing 108. Linear bearing 108 includes surface 110 of body. A plurality of polycrystalline diamond bearing elements 100 are coupled with surface 110, each having a diamond bearing surface 102. The plurality of polycrystalline diamond bearing elements 100 may be coupled with surface 110 such that diamond bearing surfaces 102 are raised above surface 110, or such that diamond bearing surfaces 102 are flush with surface 110. As shown in FIG. 1B, the polycrystalline diamond bearing elements 100 may be arranged in a staggered pattern of rows on surface 110. The present disclosure is, of course, not limited to this arrangement, and the polycrystalline diamond bearing elements may be arranged in other patterns, or may be arranged randomly.

Figure 1C:
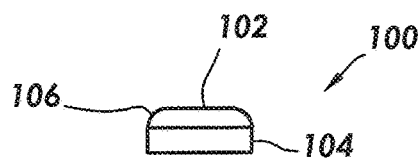
FIG. 1C is a side view of a polycrystalline diamond bearing element.

FIG. 1C depicts a side view of the polycrystalline diamond bearing element 100 of FIG. 1A, including polycrystalline diamond 106 having diamond bearing surface 102 and supported on support 104.

Figure 1D:
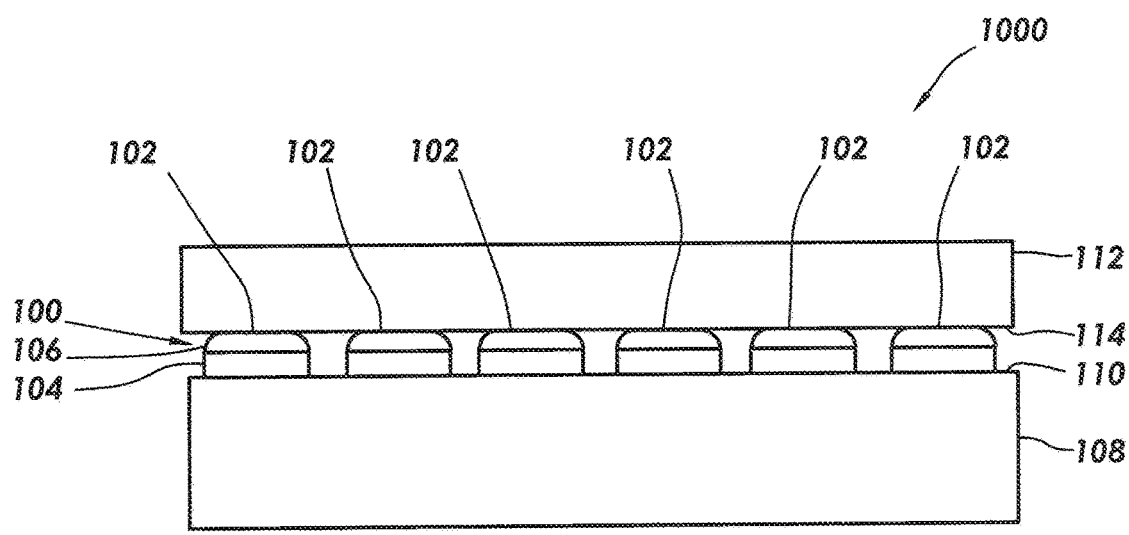
FIG. 1D is a side view of a linear bearing, having a plurality of polycrystalline diamond bearing elements thereon, engaged with an opposing bearing surface.

FIG. 1D depicts a side of a bearing assembly 1000 that includes the linear bearing 108 of FIG. 1B engaged with an opposing bearing element 112 (or opposing component) that has opposing bearing surface 114. Opposing bearing surface 114 is a surface of diamond solvent-catalyst material.

In the embodiment of FIG. 1D, the plurality of polycrystalline diamond bearing elements 100 are coupled with surface 110 such that the diamond bearing surfaces 102 are raised above surface 110. Thus, when linear bearing 108 is engaged with opposing bearing element 112, diamond bearing surfaces 102 engage with opposing bearing surface 114, but surface 110 is spaced apart from and not engaged with opposing bearing surface 114. However, the present disclosure is not limited to this particular arrangement, and the plurality of polycrystalline diamond bearing elements may be coupled with the surface of the linear bearing such that the diamond bearing surfaces are flush with the surface of the linear bearing. In such flush-mounted embodiments, the diamond bearing surfaces and the surface of the linear bearing would both be in contact with the opposing bearing surface (optionally, simultaneously). While opposing bearing surface 114 is shown as a single surface, the present disclosure is not limited to this particular arrangement, and the opposing bearing surface may be multiple, discontinuous surfaces. Also, while multiple polycrystalline diamond elements 100 are shown as providing multiple diamond bearing surfaces 102, the present disclosure is not limited to this particular arrangement, and the diamond bearing surface may be a single surface provided by single polycrystalline diamond element.

Within bearing assembly 1000, linear bearing 108 and opposing bearing element 112 are movingly (e.g., slidingly) engaged, such that one of linear bearing 108 and opposing bearing element 112 moves (e.g., slides) relative to the other.

Figure 2A:
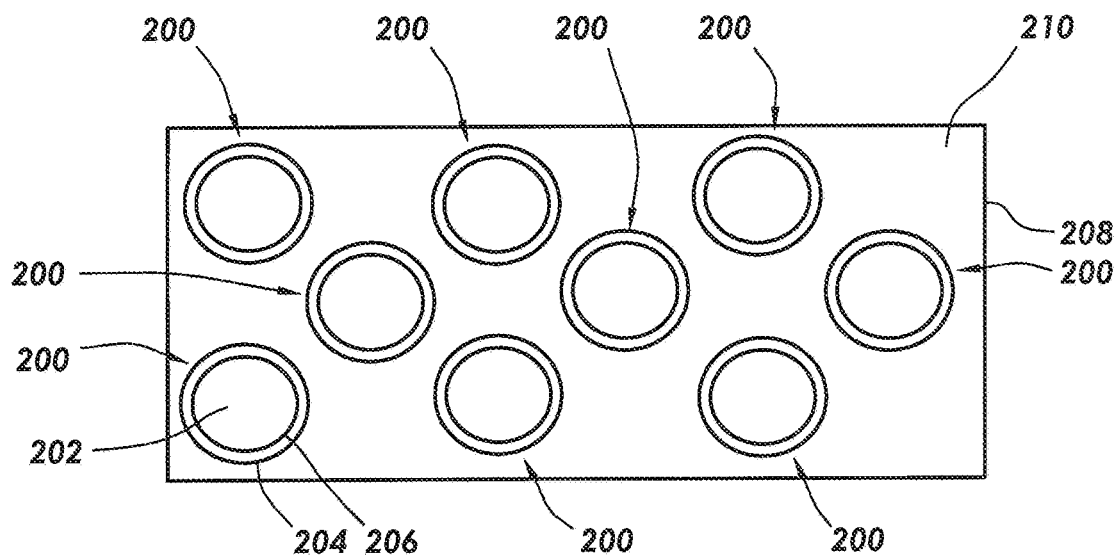
FIG. 2A is a top view of a linear bearing having a plurality of polycrystalline diamond bearing elements thereon.

FIG. 2A depicts linear bearing 208, including surface 210. A plurality of polycrystalline diamond bearing elements 200 are coupled with surface 210. Each polycrystalline diamond bearing elements 200 includes a polycrystalline diamond 206 supported on support 204, and each polycrystalline diamond 206 has a diamond bearing surface 202.

Figure 2B:
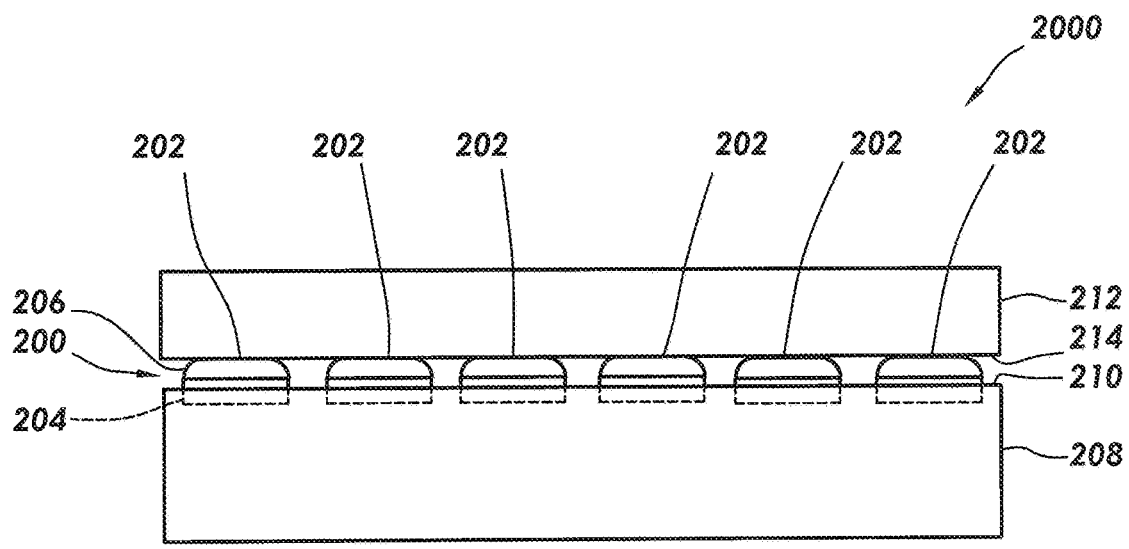
FIG. 2B is a side view of the linear bearing of FIG. 2B engaged with an opposing bearing surface.

FIG. 2B depicts a side of a bearing assembly 2000 that includes the linear bearing 208 of FIG. 2A engaged with an opposing bearing element 212 that has opposing bearing surface 214. Opposing bearing surface 214 is a surface of diamond solvent-catalyst material. In the embodiment of FIG. 2B, the plurality of polycrystalline diamond bearing elements 200 are coupled with surface 210 such that the diamond bearing surfaces 202 are raised above surface 210. Thus, when linear bearing 208 is engaged with opposing bearing element 212, diamond bearing surfaces 202 engage with opposing bearing surface 214, but surface 210 is spaced apart from and not engaged with opposing bearing surface 214. As shown in FIG. 2B, supports 204 are at least partially embedded within surface 210.

FIGS. 3A and 3B depict multi-surface linear bearings 308a and 308b, respectively, with surfaces 310 and 311, and including a bend in the surfaces 310 and 311 at angle 313. As shown in FIG. 3A, polycrystalline diamond elements 300 (including polycrystalline diamonds 306 on supports 304) are positioned and arranged relative to surfaces 310 and 311 such that polycrystalline diamond elements 300 are coupled with surface 311 such that diamond bearing surfaces 302 are engaged with surface 310. As shown in FIG. 3B, polycrystalline diamond elements 300 are positioned and arranged relative to surfaces 310 and 311 such that polycrystalline diamond elements 300 are coupled with surface 310 such that diamond bearing surfaces 302 are engaged with surface 311. Thus, the polycrystalline diamond elements 300 are arranged in linear bearings 308a to engage with an adjacent opposing engagement surface 310, and the polycrystalline diamond elements 300 are arranged in linear bearings 308b to engage with an adjacent opposing engagement surface 311. While shown as not flush-mounted in FIGS. 3A and 3B, in some embodiments the polycrystalline diamond elements are flush-mounted.

Figure 4A:
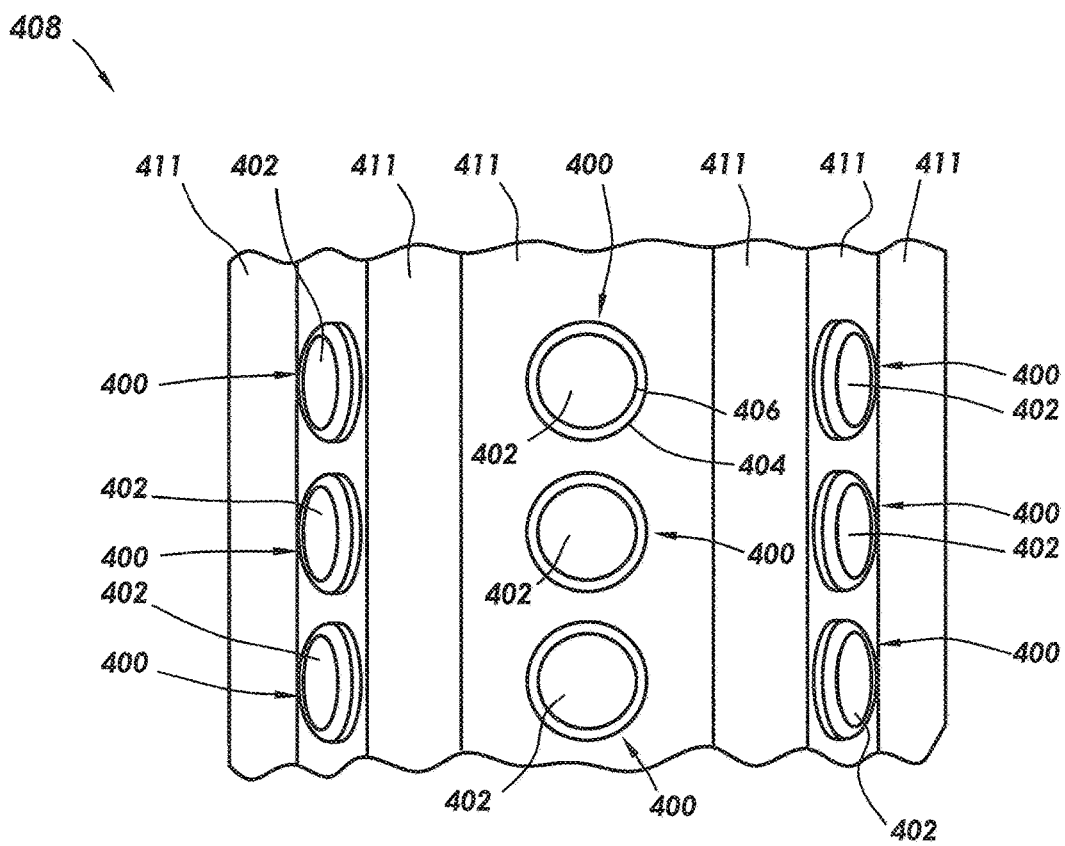
FIG. 4A depicts a linear bearing having polycrystalline diamond bearing elements on multiple surfaces thereof.
Figure 4B:
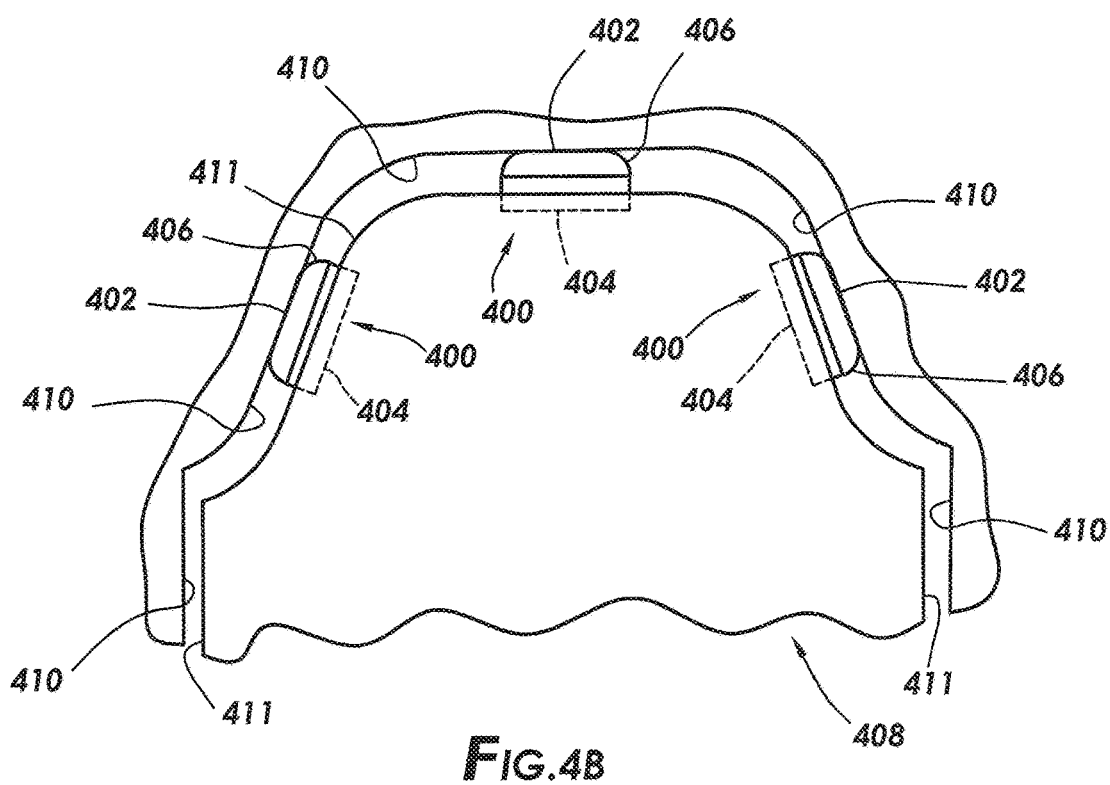
FIG. 4B is another view of the linear bearing of FIG. 4A.

FIGS. 4A and 4B depict a multi-surface linear bearing 408 with non-planar surfaces 411. Polycrystalline diamond elements 400 (including polycrystalline diamonds 406 on supports 404) are positioned and arranged on surface 411 and relative to surface 410 such that diamond bearing surfaces 402 are engaged with opposing bearing surface 410.

Figure 5A:
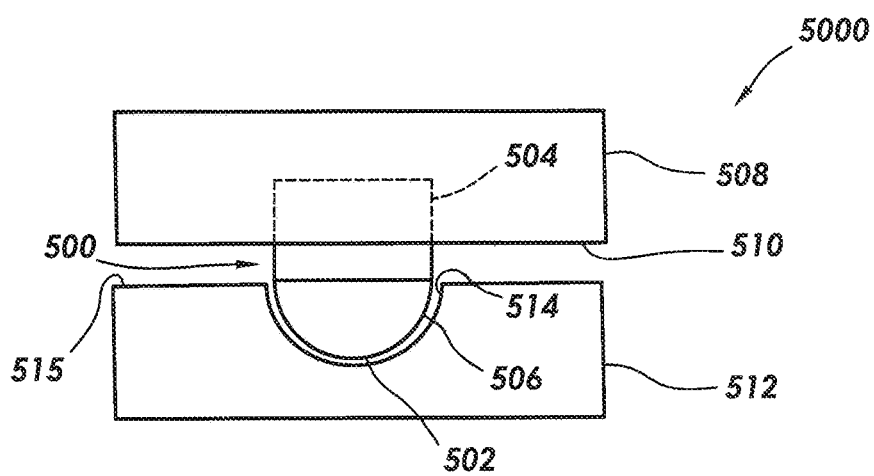
FIG. 5A is a side view of a linear bearing, having a single row of polycrystalline diamond bearing elements thereon, engaged with an opposing engagement surface.
Figure 5B:
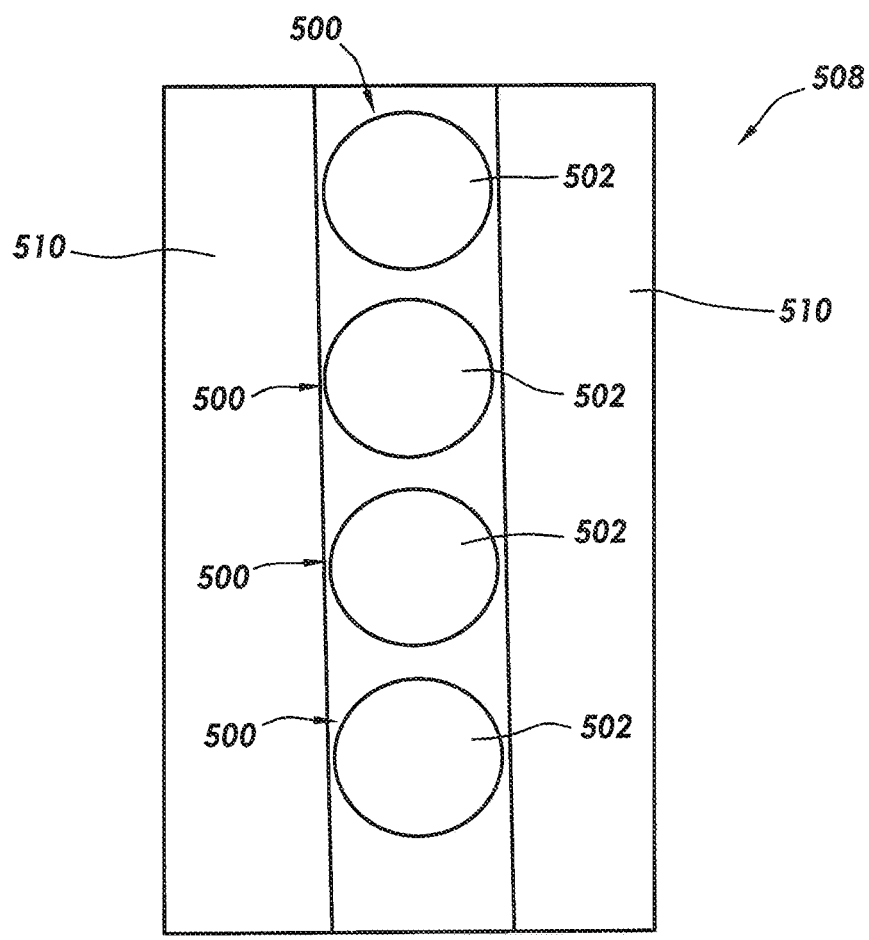
FIG. 5B is a top view of the linear bearing of FIG. 5A.

FIG. 5A depicts bearing assembly 5000, including linear bearing 508 movingly engaged with opposing bearing surface 514 of opposing bearing element 512. FIG. 5B is a top view of linear bearing element 508 in isolation from opposing bearing element 512. As shown in FIG. 5A, the polycrystalline bearing elements 500 (including polycrystalline diamonds 506 on supports 504) have curved, convex diamond bearing surfaces 502 (e.g., domed surfaces) that are engaged within curved, concave opposing bearing surfaces 514. The polycrystalline bearing elements 500 are sized and positioned such that surface 510 is maintained in a spaced-apart relationship from opposing bearing surface 514 and opposing bearing surface 515. The embodiment in FIGS. 5A and 5B have a single, linear row of aligned polycrystalline bearing elements 500. However, the present disclosure is not limited to such an arrangement, and may include multiple rows of polycrystalline bearing elements.

Figure 6A:
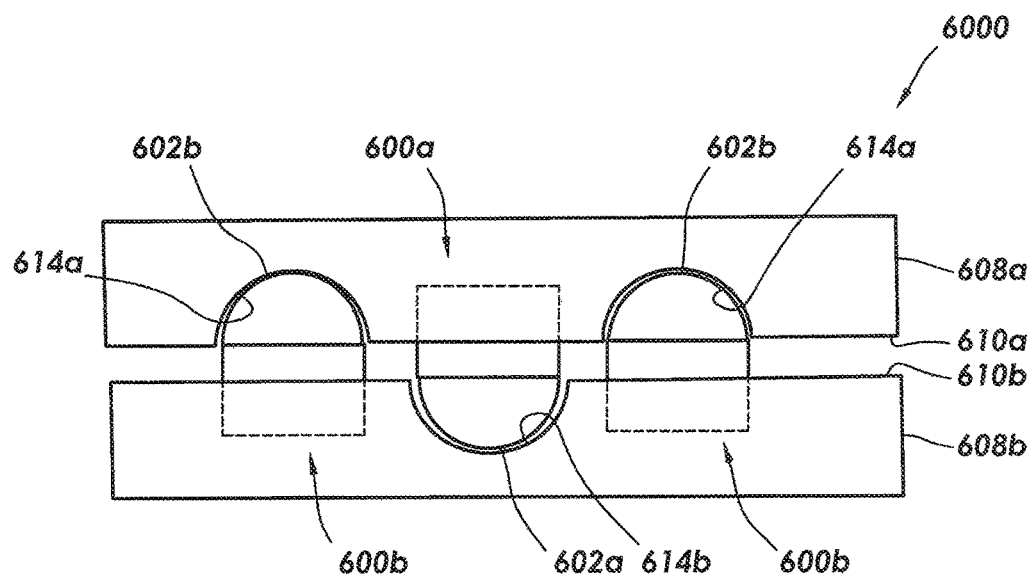
FIG. 6A is a side view of a linear bearing assembly having multiple rows of polycrystalline diamond bearing elements engaged with opposing engagement surfaces.
Figure 6B:
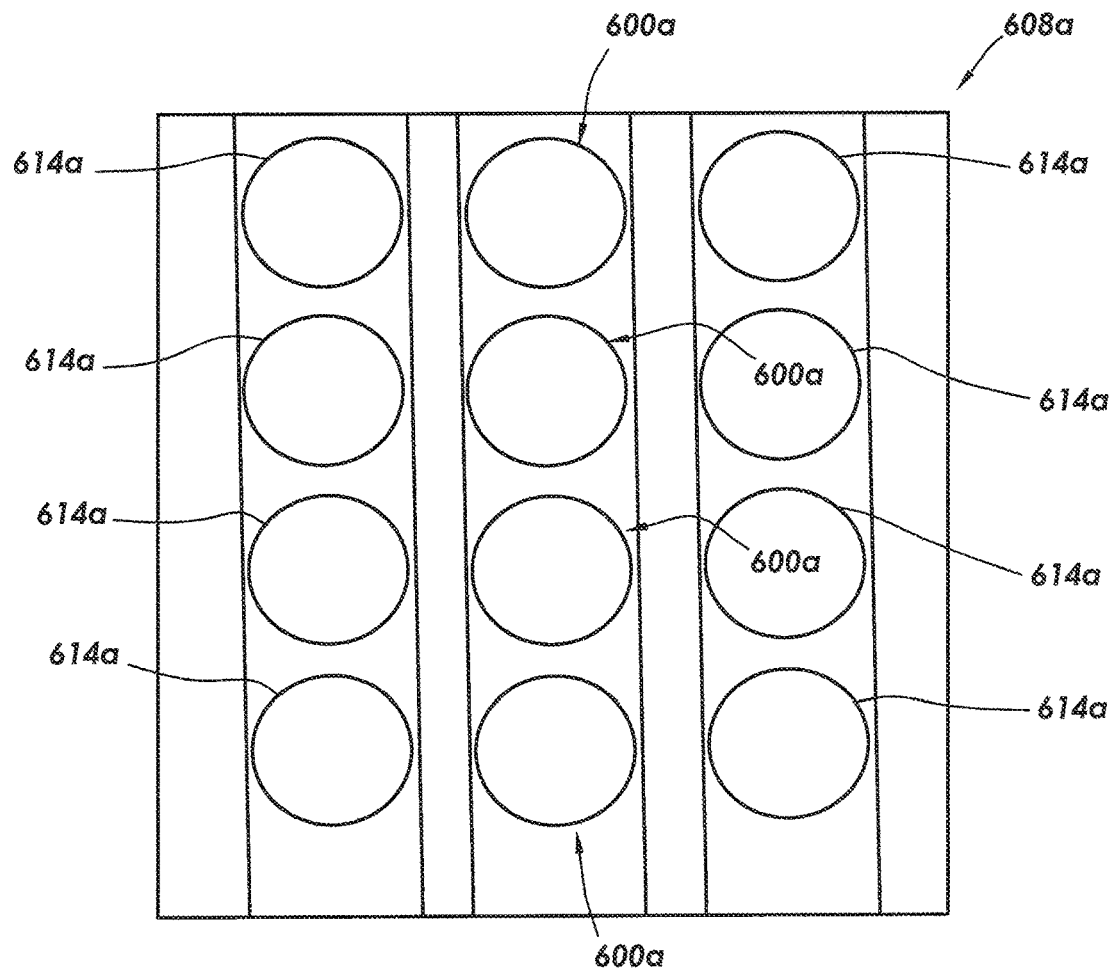
FIG. 6B is a top view of a portion of the linear bearing of FIG. 6A.

As shown in FIGS. 6A and 6B, the polycrystalline diamond bearing elements are not limited to being positioned on only one surface in a bearing assembly. With reference to FIG. 6A, bearing assembly 6000 includes linear bearing 608a movingly engaged with linear bearing 608b. Linear bearing 608a includes a single row of polycrystalline diamond bearing elements 600a having diamond bearing surfaces 602a. Linear bearing 608a also includes two rows of opposing engagement surfaces 614a, one on either side of the single row of polycrystalline diamond bearing elements 600a. Linear bearing 608b includes two rows of polycrystalline diamond bearing elements 600b having diamond bearing surfaces 602b. Linear bearing 608b also includes a single row of opposing engagement surfaces 614b between the two rows of polycrystalline diamond bearing elements 600b. With linear bearing 608a movingly engaged with linear bearing 608b, diamond bearing surfaces 602a are engaged with opposing bearing surfaces 614b, and diamond bearing surfaces 602b are engaged with opposing bearing surfaces 614a. Thus, each of linear bearing 608a and 608b provides diamond bearing surfaces for engagement with opposing bearing surfaces of the opposing linear bearing, and each of linear bearing 608a and 608b provides opposing bearing surfaces (of diamond reactive material) for engagement with diamond bearing surfaces of the opposing linear bearing. The surfaces 610a and 610b are maintained in a spaced-apart relationship from one another.

Figure 7A:
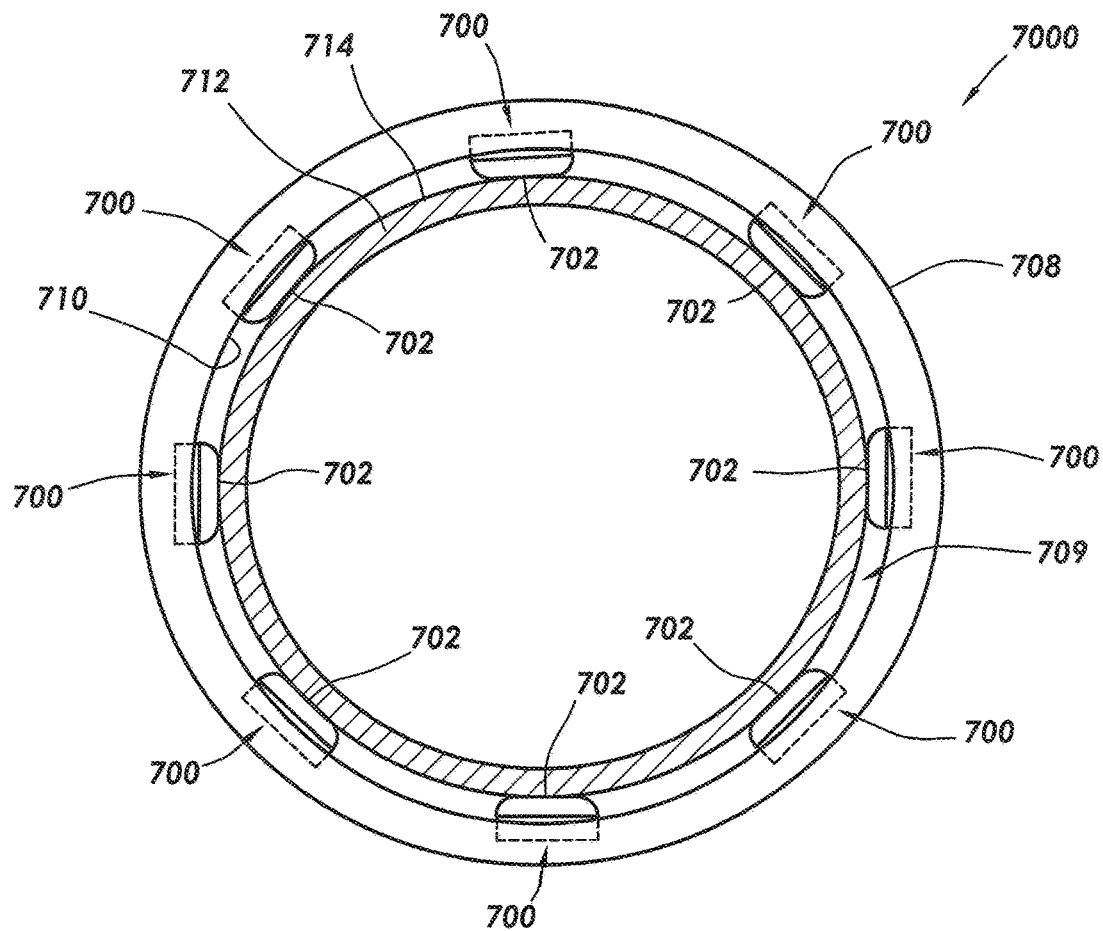
FIG. 7A is an end view of a cylindrical linear bearing assembly having multiple polycrystalline diamond bearing elements thereon engaged with an opposing engagement surface of a tubular.
Figure 7B:
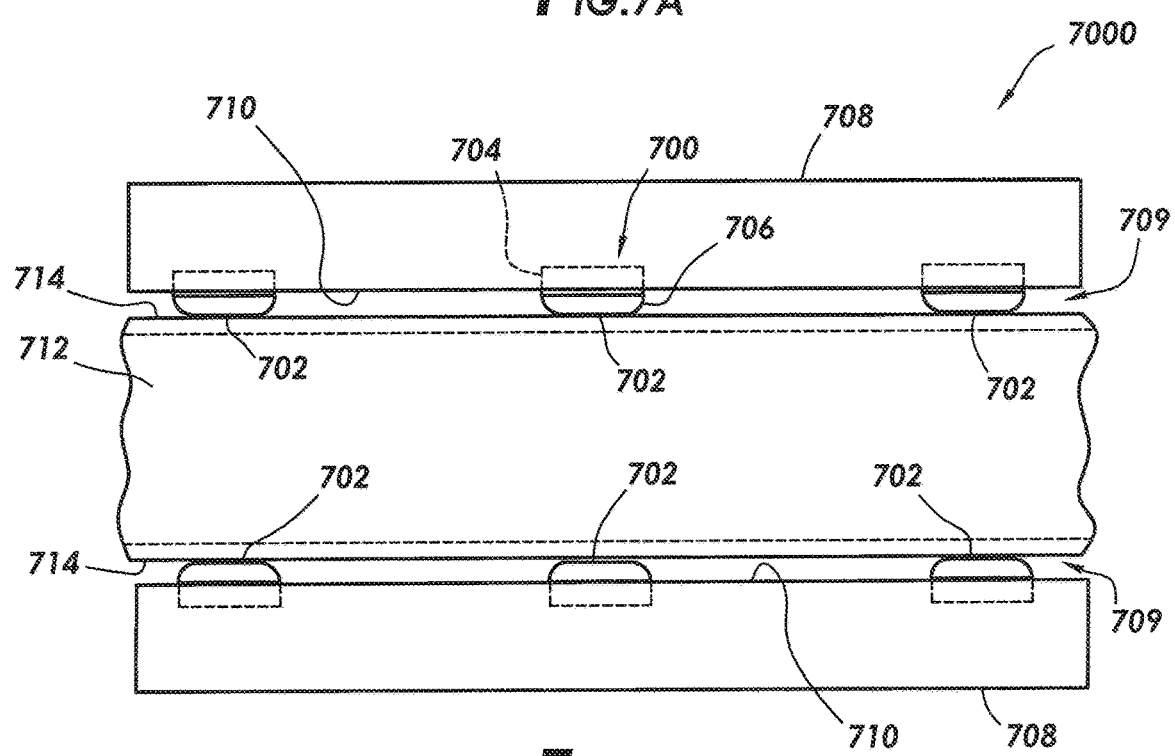
FIG. 7B is a side, cross-sectional view of the linear bearing assembly of FIG. 7A.

FIGS. 7A and 7B depict a bearing assembly that includes a bearing element engaged with a tubular. Bearing assembly 7000 includes bearing element 708 movingly engaged with tubular 712. Bearing element 708 is a hollow cylinder with the annulus of surface 710 defining the hollow or cavity 709 of bearing element 708. A plurality of polycrystalline diamond bearing elements 700, each including a support 704 and polycrystalline diamond 706, are coupled with and arranged about surface 710 such that the diamond bearing surfaces 702 thereof are positioned to face into the cavity 709 of bearing element 708. The outer surface of tubular 712 defines opposing bearing surface 714. Tubular 712 is positioned within cavity 709 such that opposing bearing surface 714 is circumferentially surrounded by the polycrystalline diamond bearing elements 700 of bearing element 708. The diamond bearing surfaces 702 are positioned to engage with opposing bearing surface 714, and extend from surface 710 such that surface 710 is maintained in a spaced-apart relationship relative to opposing bearing surface 714. One skilled in the art would understand that the arrangement of FIGS. 7A and 7B could be reversed without departing from the scope of this disclosure. That is, inner surface of the hollow cylinder may define the opposing bearing surface, and the polycrystalline diamond bearing elements may be positioned on the outer surface of the tubular for engagement with the opposing bearing surface. While tubular 712 is shown as hollow, in some embodiments, tubular 712 may be solid.

Figure 8A:
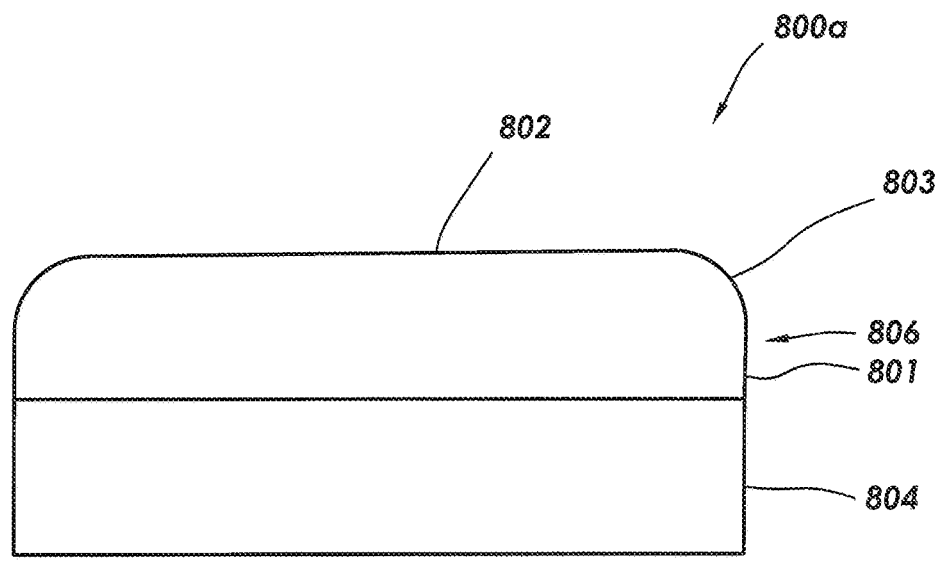
FIGS. 8A-8E depict various embodiments of polycrystalline diamond bearing elements having different surface contours.
Figure 8B:
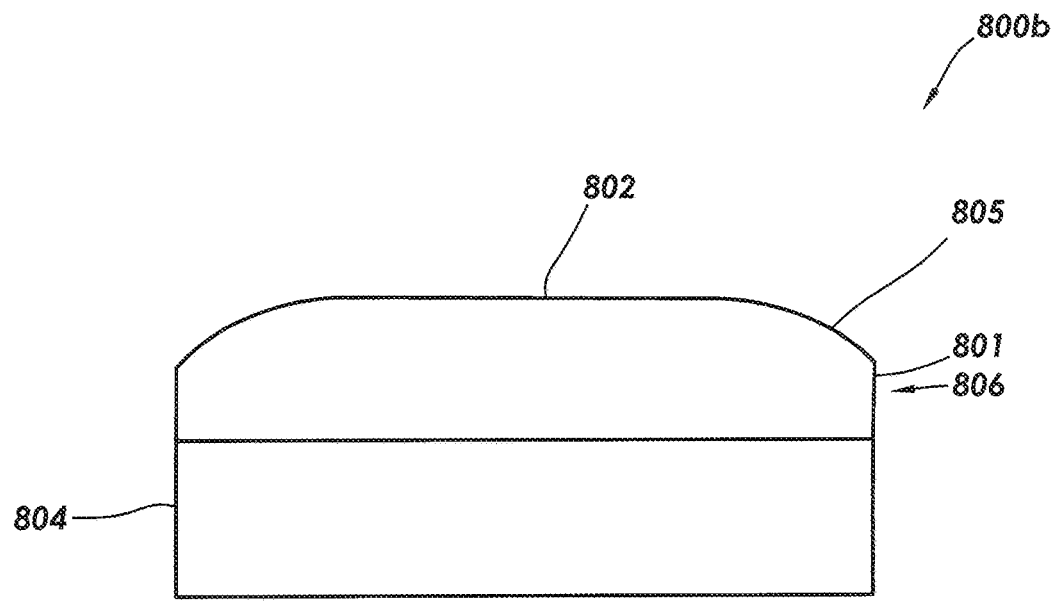
Figure 8C:
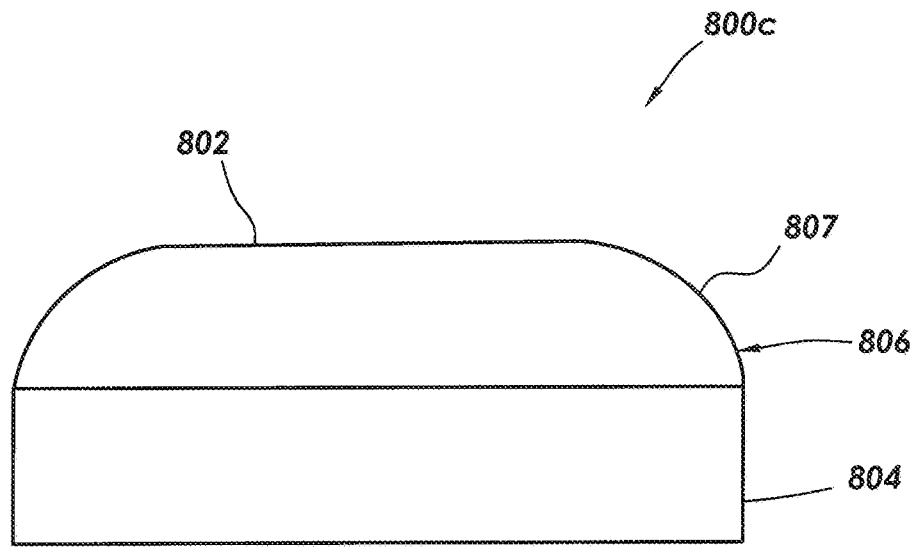
Figure 8D:
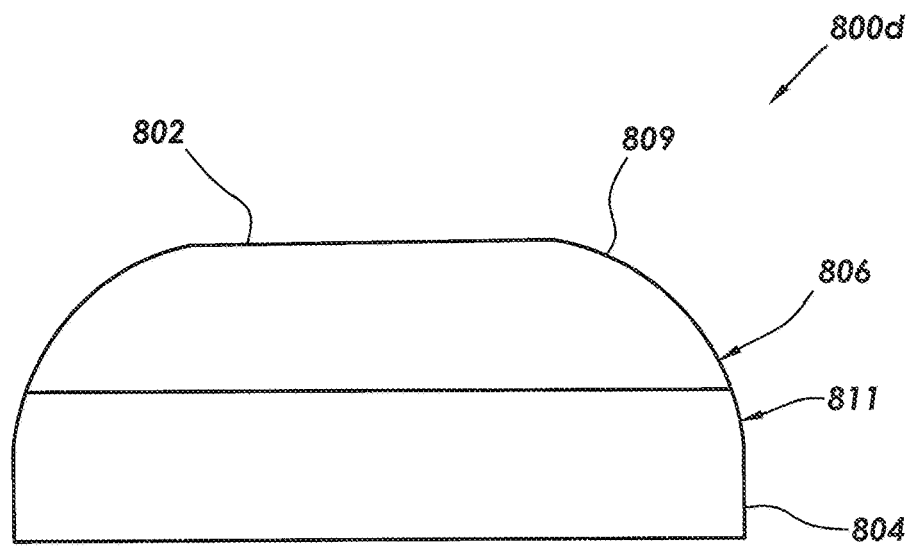
Figure 8E:
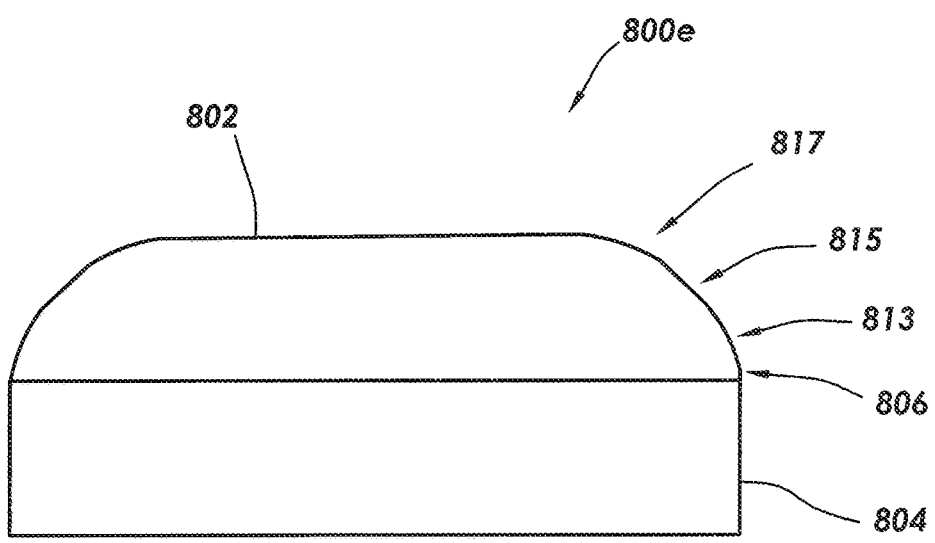
Figure 10C:
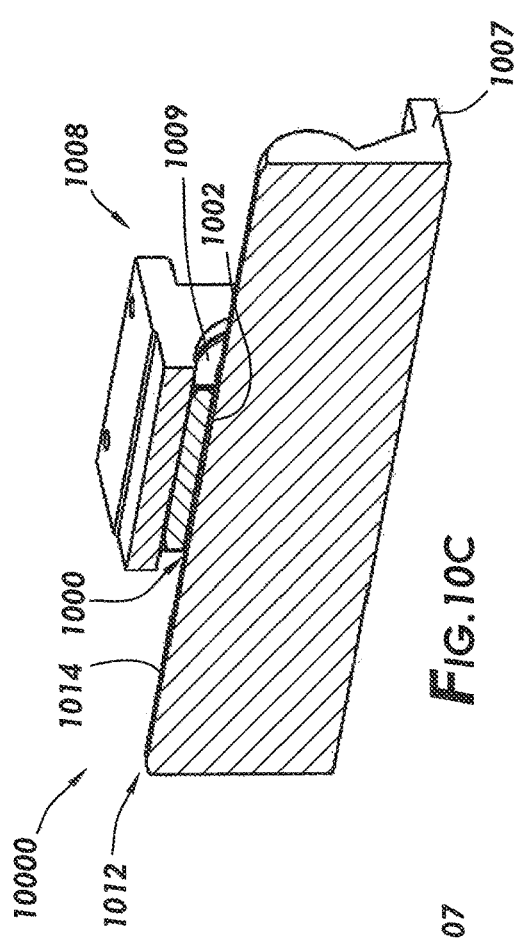
FIGS. 10A-10D depict an open continuous sleeve bearing in accordance with the present disclosure.
Figure 10A:
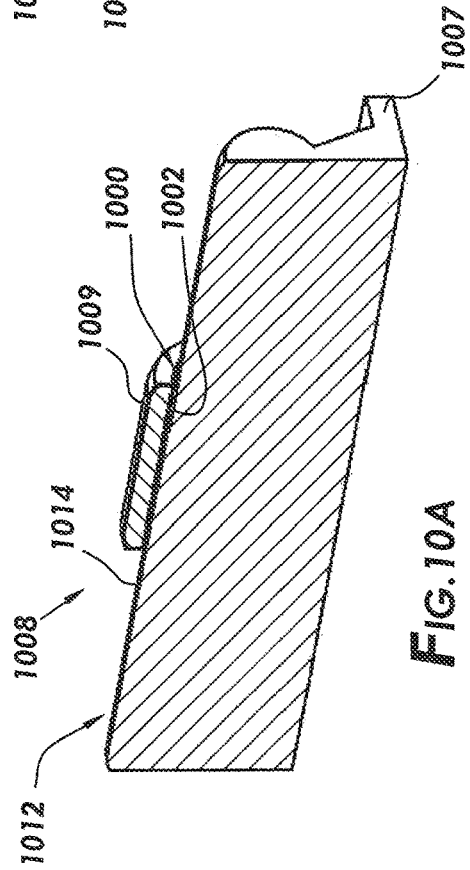
Figure 10D:
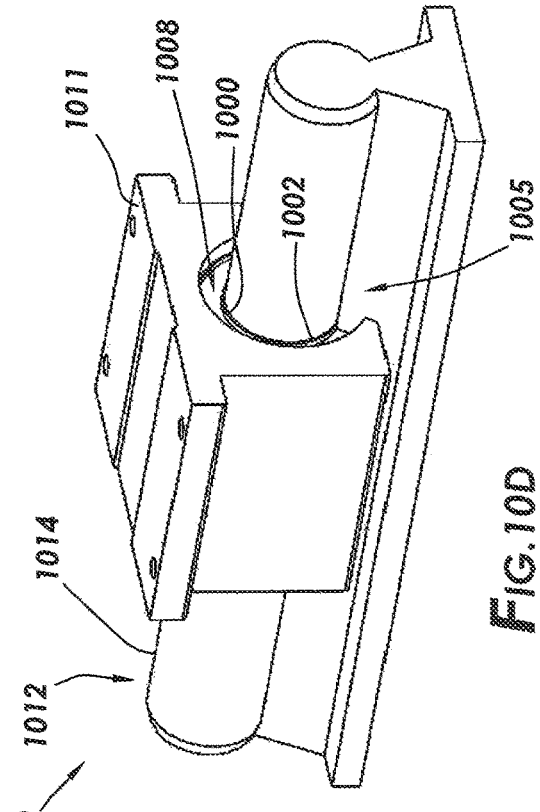
Figure 10B:
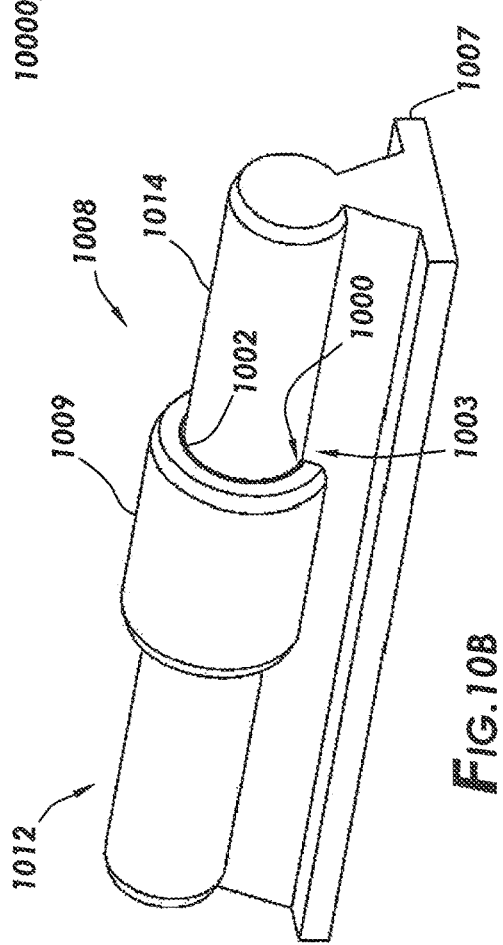

FIGS. 8A-8E depict various embodiments of the polycrystalline diamond bearing elements disclosed herein. As is evident from FIGS. 8A-8E, the polycrystalline diamond bearing elements disclosed herein can have various shapes, contours, and surface features. One skilled in the art would understand, of course, that the polycrystalline diamond bearing elements disclosed herein are not limited to the embodiments shown in FIGS. 8A-8E. FIG. 8A depicts polycrystalline diamond bearing element 800*a*, including polycrystalline diamond 806 supported on support element 804. Polycrystalline diamond 806 has a curved or beveled edge 803 and a straight edge 801, as well as polycrystalline diamond bearing surface 802. Such curvature or beveling may preclude edge contact between the polycrystalline diamond 806 and the opposing bearing surface in certain applications. The polycrystalline diamond bearing element 800*b* of FIG. 8B is substantially similar to that of FIG. 8A, with the exception that polycrystalline diamond bearing element 800*b* has curved or beveled edge 805 that is curved or beveled at a different angle relative to diamond bearing surface 802 than curved or beveled edge 803. The polycrystalline diamond bearing element 800*c* of FIG. 8C is substantially similar to that of FIG. 8A, with the exception that polycrystalline diamond bearing element 800*c* has curved or beveled edge 807 that is curved or beveled at a different angle relative to diamond bearing surface 802 than curved or beveled edge 803. Also, curved or beveled edge 807 extends to support 804 and lacks a straight edge portion, whereas, the polycrystalline diamond 806 of FIG. 8A has a straight edge portion 801. The polycrystalline diamond bearing element 800*d* of FIG. 8D is substantially similar to that of FIG. 8C, with the exception that polycrystalline diamond bearing element 800*d* has curved or beveled edge 809 that is curved or beveled at a different angle relative to diamond bearing surface 802 than curved or beveled edge 807. Also, the support 804 of FIG. 8D has a curved or beveled surface 811. The polycrystalline diamond bearing element 800*e* of FIG. 8E is substantially similar to that of FIG. 8A, with the exception that polycrystalline diamond bearing element 800*e* has multiple, different curved or beveled edges 813, 815, and 817. While the polycrystalline diamonds shown in the Figures are shown as being supported on support elements, the present disclosure is not limited to such polycrystalline diamonds, and may include unsupported polycrystalline diamonds.

Linear Bearing Sleeves

FIGS. 9A-9D depict an exemplary application of the linear bearings disclosed herein, as continuous sleeve bearings. Bearing assembly 9000 includes bearing element 908 movingly engaged with tubular 912. Bearing element 908 includes hollow cylinder 909 coupled with body 911. A polycrystalline diamond bearing element 900 is coupled with and arranged within the annulus of hollow cylinder 909 on a surface thereof such that diamond bearing surface 902 thereof is positioned to face tubular 912. The outer surface of tubular 912 defines opposing bearing surface 914. Tubular 912 is positioned within the cavity of hollow tubular 909 such that opposing bearing surface 914 is circumferentially surrounded by the polycrystalline diamond bearing element 900. The diamond bearing surface 902 is positioned to engage with opposing bearing surface 914. One skilled in the art would understand that the arrangement of FIGS. 9A-9D could be reversed without departing from the scope of this disclosure. That is, inner surface of the hollow cylinder may define the opposing bearing surface, and the polycrystalline diamond bearing element may be positioned on the outer surface of the tubular for engagement with the opposing bearing surface. While tubular 912 is shown as solid, in some embodiments, the tubular may be hollow.

FIGS. 10A-10D depict an exemplary application of the linear bearings disclosed herein, as open continuous sleeve bearings. Bearing assembly 10000 includes bearing element 1008 movingly engaged with rail 1012. Rail 1012 is similar to tubular 912, with the exception that the tubular portion of rail 1012 is coupled with a base 1007. Bearing element 1008 includes hollow cylinder 1009 coupled with body 1011. Hollow cylinder 1009 is similar to hollow cylinder 909, with the exception that hollow cylinder 1009 is open on one side 1003. Also, body 1011 is similar to body 911, with the exception that body 1011 is open on one side 1005. A polycrystalline diamond bearing element 1000 is coupled with and arranged within the annulus of hollow cylinder 1009 on a surface thereof such that diamond bearing surface 1002 thereof is positioned to face rail 1012. The outer surface of rail 1012 defines opposing bearing surface 1014. Rail 1012 is positioned within the cavity of hollow tubular 1009 such that opposing bearing surface 1014 is circumferentially surrounded by the polycrystalline diamond bearing element 1000. The diamond bearing surface 1002 is positioned to engage with opposing bearing surface 1014. One skilled in the art would understand that the arrangement of FIGS. 10A-10D could be reversed without departing from the scope of this disclosure. That is, inner surface of the hollow cylinder may define the opposing bearing surface, and the polycrystalline diamond bearing element may be positioned on the outer surface of the tubular for engagement with the opposing bearing surface.

Applications

The present disclosure provides for linear bearings that may exhibit: (1) a low coefficient of friction during use; (2) a long operational life; (3) less susceptibility to point loading; (4) the ability to withstand contamination without an unacceptable increase in wear; (5) the ability to operate successfully without lubrication; or (6) combinations thereof. In some embodiments, the linear bearings disclosed herein exhibit a coefficient of friction (CoF) of 0.1 or less, or 0.05 or less, or 0.01 or less, or from 0.01 to 0.1.

In certain embodiments, the linear bearings disclosed herein are suitable for use in machine tool ways, precision positioning tables, robotics, additive manufacturing printers, transfer shuttles, food processing equipment, and semiconductor manufacturing. The linear bearings disclosed herein are, of course, not limited to these particular exemplary applications, and may be used in other applications where linear bearings are used, such as the applications disclosed in U.S. Pat. Nos. 2,693,396; 3,582,161; 3,603,652; 3,752,541; 5,193,363; 4,428,627; 9,222,515; and 5,618,114. In some embodiments, the linear bearings disclosed herein are linear-motion bearings or linear slides configured to provide free linear motion in two opposing directions along an axis. In some such embodiments, the linear bearings disclosed herein are used to provide bearing to motorized components. In other embodiments, the linear bearings disclosed herein are plain bearings, such as dovetail slides, compound slides or rack slides. In some embodiments, the linear bearings disclosed herein are used as bearings for relatively heavy and/or large structures, such as to provide load sliding capabilities to such structures. For example, the linear bearings disclosed herein may be used on skid plates for moving heavy equipment, such as for moving oilfield rigs. The linear bearings disclosed herein may be used to provide sliding capabilities to large structures, such as expansion joints in bridges, buildings, and pipeline support structures; thereby, providing for movement of such structures.

EMBODIMENTS

Certain embodiments will now be described.

Embodiment 1. A linear bearing assembly, the assembly comprising: a linear bearing comprising a body having a surface; a polycrystalline diamond bearing element coupled with the surface, wherein the polycrystalline diamond bearing element has a polycrystalline diamond bearing surface; an opposing component, the opposing component having an opposing bearing surface thereon, the opposing bearing surface comprising a material containing at least 2 weight percent of diamond solvent-catalyst based on a total weight of the material; wherein the linear bearing is movably coupled with the opposing component such that the polycrystalline diamond bearing surface is engaged with the diamond solvent-catalyst.

Embodiment 2. The assembly of embodiment 1, wherein the polycrystalline diamond bearing surface has a surface finish of less than 5 μin.

Embodiment 3. The assembly of any of embodiments 1 or 2, wherein the opposing bearing surface is hardened, plated, coated, or cladded.

Embodiment 4. The assembly of any of embodiments 1 to 3, wherein the material of the opposing bearing surface comprises from 5 to 100 wt. % of the diamond solvent-catalyst based on the total weight of the material.

Embodiment 5. The assembly of any of embodiments 1 to 4, wherein the diamond solvent-catalyst comprises iron, cobalt, nickel, ruthenium, rhodium, palladium, chromium, manganese, copper, titanium, or tantalum.

Embodiment 6. The assembly of any of embodiments 1 to 5, wherein the material of the opposing bearing surface is softer than a superhard material.

Embodiment 7. The assembly of any of embodiments 1 to 6, wherein the linear bearing assembly is lubricated.

Embodiment 8. The assembly of any of embodiments 1 to 6, wherein the linear bearing assembly is non-lubricated.

Embodiment 9. The assembly of any of embodiments 1 to 8, wherein the polycrystalline diamond bearing surface is in direct contact with the opposing bearing surface.

Embodiment 10. The assembly of any of embodiments 1 to 8, wherein a fluid film is positioned between the polycrystalline diamond bearing surface and the opposing bearing surface.

Embodiment 11. The assembly of any of embodiments 1 to 10, wherein the polycrystalline diamond bearing surface is flush with the surface of the body.

Embodiment 12. The assembly of any of embodiments 1 to 10, wherein the polycrystalline diamond bearing surface is raised above the surface of the body.

Embodiment 13. The assembly of any of embodiments 1 to 12, wherein the polycrystalline diamond bearing surface is planar, convex, or concave.

Embodiment 14. The assembly of any of embodiments 1 to 13, wherein the polycrystalline diamond bearing element is positioned such the surface of the body is maintained in a spaced-apart relationship from the opposing bearing surface.

Embodiment 15. The assembly of any of embodiments 1 to 14, wherein the polycrystalline diamond bearing element is raised above the surface of the body, and wherein the opposing bearing surface is a concavity in the opposing component.

Embodiment 16. The assembly of any of embodiments 1 to 15, wherein the body of the linear bearing has a second opposing bearing surface thereon, wherein the opposing component has a second polycrystalline diamond bearing element thereon, and wherein a polycrystalline diamond bearing surface of the second polycrystalline diamond bearing element is engaged with the second opposing bearing surface.

Embodiment 17. The assembly of any of embodiments 1 to 16, wherein the linear bearing is a hollow cylinder with the surface of the body defining the annulus of the hollow cylinder, wherein the opposing component is a tubular positioned within the annulus of the hollow cylinder, and wherein the outer surface of the tubular is the opposing bearing surface thereon.

Embodiment 18. The assembly of any of embodiments 1 to 16, wherein the opposing component is a hollow cylinder with the opposing bearing surface defining the annulus of the hollow cylinder, wherein the linear bearing is a tubular positioned within the annulus of the hollow cylinder, and wherein the outer surface of the tubular is the surface of the body.

Embodiment 19. The assembly of any of embodiments 1, to 18 wherein the polycrystalline diamond bearing element has at least one curved or beveled edge.

Embodiment 20. A method of bearing load, the method comprising: providing a linear bearing comprising a body having a surface and a polycrystalline diamond bearing element coupled with the surface, wherein the polycrystalline diamond bearing element has a polycrystalline diamond bearing surface; providing an opposing component having an opposing bearing surface thereon, the opposing bearing surface comprising a material containing at least 2 weight percent of diamond solvent-catalyst based on a total weight of the material; movably coupling the linear bearing with the opposing component such that the polycrystalline diamond bearing surface is engaged with the diamond solvent-catalyst.

Embodiment 21. A linear bearing assembly, the assembly comprising: a linear bearing comprising a body having a surface; a plurality of polycrystalline diamond bearing elements coupled with the surface, wherein each polycrystalline diamond bearing element has a polycrystalline diamond bearing surface; an opposing component, the opposing component having an opposing bearing surface thereon, the opposing bearing surface comprising a material containing at least 2 weight percent of diamond solvent-catalyst based on a total weight of the material; wherein the linear bearing is movably coupled with the opposing component such that the polycrystalline diamond bearing surfaces are engaged with the diamond solvent-catalyst.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A linear bearing assembly, the assembly comprising:
 a linear bearing comprising a polycrystalline diamond bearing element, wherein the polycrystalline diamond bearing element has a polycrystalline diamond bearing surface, the polycrystalline diamond bearing surface having a surface finish of at most 20 μin Ra;
 an opposing component, the opposing component having a metal bearing surface thereon, the metal bearing surface comprising a metal containing at least 2 weight percent of diamond solvent-catalyst based on a total weight of the metal;
 wherein the linear bearing is movably coupled with the opposing component such that the polycrystalline diamond bearing surface is engaged with the metal bearing surface.

2. The assembly of claim 1, wherein the polycrystalline diamond bearing surface has a surface finish of less than 2 μin Ra.

3. The assembly of claim 1, wherein the metal bearing surface is hardened, plated, coated, or cladded.

4. The assembly of claim 1, wherein the metal of the metal bearing surface comprises from 55 to 100 wt. % of the diamond solvent-catalyst based on the total weight of the metal.

5. The assembly of claim 1, wherein the diamond solvent-catalyst is selected from the group consisting of: iron, cobalt, nickel, ruthenium, rhodium, palladium, chromium, manganese, copper, titanium, tantalum, and combinations thereof.

6. The assembly of claim 1, wherein the metal is softer than a superhard material.

7. The assembly of claim 1, wherein the linear bearing assembly is lubricated.

8. The assembly of claim 1, wherein the linear bearing assembly is non-lubricated.

9. The assembly of claim 1, wherein the polycrystalline diamond bearing surface is in direct contact with the metal bearing surface.

10. The assembly of claim 1, wherein a fluid film is positioned between the polycrystalline diamond bearing surface and the metal bearing surface.

11. The assembly of claim 1, wherein the polycrystalline diamond bearing surface is flush with a surface of a body of the linear bearing.

12. The assembly of claim 1, wherein the polycrystalline diamond bearing surface is raised above a surface of a body of the linear bearing.

13. The assembly of claim 1, wherein the polycrystalline diamond bearing surface is planar, convex, or concave.

14. The assembly of claim 1, wherein the polycrystalline diamond bearing element is positioned such that a surface of a body of the linear bearing is maintained in a spaced-apart relationship from the metal bearing surface.

15. The assembly of claim 1, wherein the polycrystalline diamond bearing element is raised above a surface of a body of the linear bearing, and wherein the metal bearing surface is a concavity in the opposing component.

16. The assembly of claim 1, wherein the linear bearing has a second opposing bearing surface thereon, wherein the opposing component has a second polycrystalline diamond bearing element thereon, and wherein a polycrystalline diamond bearing surface of the second polycrystalline diamond bearing element is engaged with the second opposing bearing surface.

17. The assembly of claim 1, wherein the linear bearing is a hollow cylinder including an annulus, wherein the opposing component is a tubular positioned within the annulus of the hollow cylinder, and wherein an outer surface of the tubular is the metal bearing surface.

18. The assembly of claim 1, wherein the opposing component is a hollow cylinder with the metal bearing surface defining an annulus of the hollow cylinder, wherein the linear bearing is a tubular positioned within the annulus of the hollow cylinder.

19. The assembly of claim 1, wherein the polycrystalline diamond bearing element has at least one curved or beveled edge.

20. A method of bearing load, the method comprising:
 providing a linear bearing comprising a polycrystalline diamond bearing element, wherein the polycrystalline diamond bearing element has a polycrystalline diamond bearing surface having a surface finish of at most 20 μin Ra;
 providing an opposing component having a metal bearing surface thereon, the metal bearing surface comprising a metal containing at least 2 weight percent of diamond solvent-catalyst based on a total weight of the metal;
 movably coupling the linear bearing with the opposing component such that the polycrystalline diamond bearing surface is engaged with the metal bearing surface.

21. The assembly of claim 1, further comprising:
 wherein the linear bearing comprises a plurality of polycrystalline diamond bearing elements, wherein each polycrystalline diamond bearing element has a polycrystalline diamond bearing surface with a surface finish of at most 20 μin Ra;
 wherein the linear bearing is movably coupled with the opposing component such that each of the polycrystalline diamond bearing surfaces are engaged with the metal bearing surface.

22. The assembly of claim 1, wherein engagement between the linear bearing and the opposing component exhibits a coefficient of friction of less than 0.1.

23. The assembly of claim 1, wherein the polycrystalline bearing element comprises a polycrystalline diamond compact.

24. A linear bearing assembly, the assembly comprising:
 a linear bearing comprising a polycrystalline diamond bearing element, wherein the polycrystalline diamond bearing element has a polycrystalline diamond bearing surface, the polycrystalline diamond bearing surface having a surface finish of at most 20 μin Ra;
 an opposing component, the opposing component having a metal bearing surface thereon, the metal bearing surface comprising a metal containing at least 2 weight percent of iron, cobalt, nickel, ruthenium, rhodium, palladium, chromium, manganese, copper, titanium, tantalum, or combinations thereof, based on a total weight of the metal;
wherein the linear bearing is movably coupled with the opposing component such that the polycrystalline diamond bearing surface is engaged with the metal bearing surface.

* * * * *